United States Patent
Richardson et al.

(10) Patent No.: US 12,275,038 B2
(45) Date of Patent: *Apr. 15, 2025

(54) PAINT REPAIR PROCESS BY SCENARIO

(71) Applicant: 3M INNOVATIVE PROPERTIES COMPANY, St. Paul, MN (US)

(72) Inventors: Nicholas D. Richardson, Mahtomedi, MN (US); Brett R. Hemes, Woodbury, MN (US); Mark W. Orlando, Chesterfield Township, MI (US); Juan A. Munoz, Inver Grove Heights, MN (US); Sarah M. Mullins, St. Paul, MN (US); Matthew H. Purdin, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/425,035

(22) PCT Filed: Aug. 23, 2019

(86) PCT No.: PCT/IB2019/057107
§ 371 (c)(1),
(2) Date: Jul. 22, 2021

(87) PCT Pub. No.: WO2020/161534
PCT Pub. Date: Aug. 13, 2020

(65) Prior Publication Data
US 2022/0126319 A1   Apr. 28, 2022

Related U.S. Application Data

(60) Provisional application No. 62/801,310, filed on Feb. 5, 2019.

(51) Int. Cl.
  *B05D 5/00*   (2006.01)
  *B05D 3/12*   (2006.01)
  (Continued)

(52) U.S. Cl.
  CPC .............. *B05D 5/005* (2013.01); *B05D 3/12* (2013.01); *B25J 9/163* (2013.01); *B25J 11/0065* (2013.01);
  (Continued)

(58) Field of Classification Search
None
See application file for complete search history.

(56) References Cited

U.S. PATENT DOCUMENTS 5,331,770 A   7/1994  Ichonohe et al.
6,013,308 A * 1/2000  Saito ....................... B24B 19/26
                                                     451/6
(Continued)

FOREIGN PATENT DOCUMENTS

CN   107378780 A  * 11/2017  ............. B24B 51/00
CN   108608296 A  * 10/2018  ............. B24B 51/00
JP   H04310360 A    11/1992

OTHER PUBLICATIONS

"In situ." Merriam-Webster.com Dictionary, Merriam-Webster (2017), https://www.merriam-webster.com/dictionary/in%20situ (Year: 2017).*

(Continued)

*Primary Examiner* — Jose I Hernandez-Kenney

(57) ABSTRACT

A method and associated system provides automated abrasive paint repair using automated abrasive paint repair devices that selectively sand, buff, and polish a substrate in response to received instructions generated by a controller. The controller receives coordinates of each identified defect in the substrate along with parameters describing characteristics of each defect, selects a sanding process, a buffing (Continued)

process, and/or a polishing process based on empirically derived rules established by skilled/expert human operators and the received parameters. The controller outputs instructions to cause the automated abrasive paint repair devices to execute the selected sanding process, buffing process, and/or polishing process using the received parameters. The empirically derived rules and parameters may be stored in a lookup table and/or updated by a machine learning module.

5 Claims, 22 Drawing Sheets

(51) Int. Cl.
    *B25J 9/16*     (2006.01)
    *B25J 11/00*     (2006.01)
    *G01N 21/88*     (2006.01)
    *G05B 13/02*     (2006.01)
    *G05B 19/408*     (2006.01)
    *G05B 19/418*     (2006.01)

(52) U.S. Cl.
    CPC ..... *G05B 13/0265* (2013.01); *G05B 19/4083* (2013.01); *G05B 19/41875* (2013.01); *B25J 11/0075* (2013.01); *G01N 21/88* (2013.01); *G05B 2219/45013* (2013.01); *G05B 2219/45065* (2013.01); *Y02P 90/02* (2015.11)

(56) References Cited

U.S. PATENT DOCUMENTS

| | | | |
|---|---|---|---|
| 6,320,654 B1* | 11/2001 | Alders | G01N 21/8806 356/237.2 |
| 8,892,255 B2* | 11/2014 | Eberst | B25J 9/1671 700/254 |
| 9,811,057 B2 | 11/2017 | Zhi | |
| 2003/0139836 A1* | 7/2003 | Matthews | B05D 5/005 700/109 |
| 2015/0088300 A1* | 3/2015 | Kilibarda | B25J 15/04 901/41 |
| 2017/0132801 A1 | 5/2017 | Trenholm | |
| 2017/0277979 A1* | 9/2017 | Allen | G06V 10/141 |
| 2018/0207768 A1 | 7/2018 | Shibuya et al. | |
| 2018/0326591 A1* | 11/2018 | Häusler | G06V 10/98 |
| 2018/0348730 A1* | 12/2018 | Reekmans | B25J 9/1671 |
| 2019/0240799 A1 | 8/2019 | Takeda et al. | |

OTHER PUBLICATIONS

"Action." Merriam-Webster.com Dictionary, Merriam-Webster (2018), https://www.merriam-webster.com/dictionary/action. (Year: 2018).*
International Search Report for PCT International Application No. PCT/IB2019/057107, mailed on Dec. 2, 2019, 5 pages.

* cited by examiner

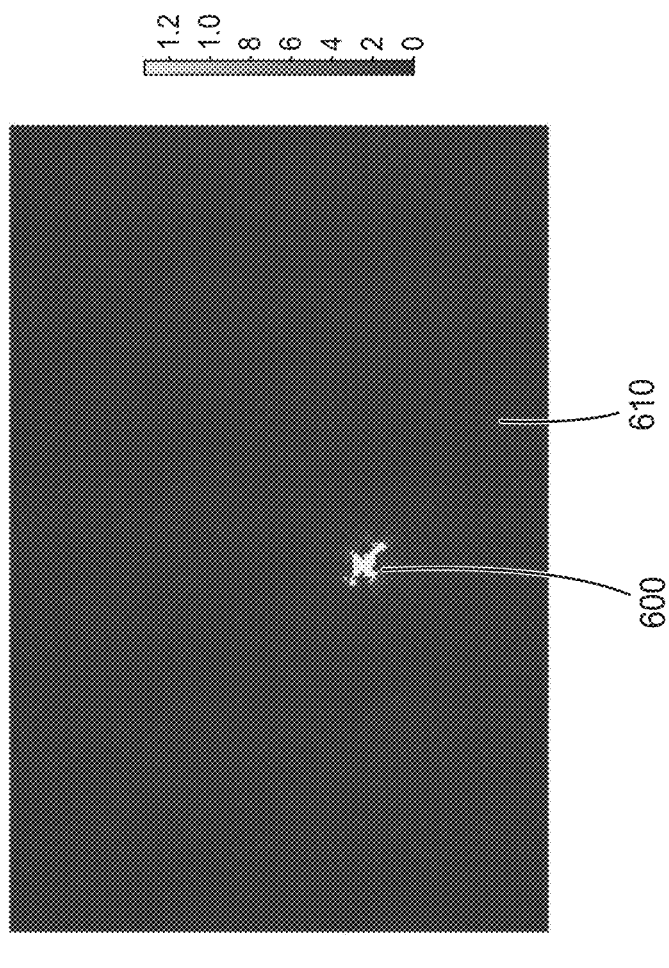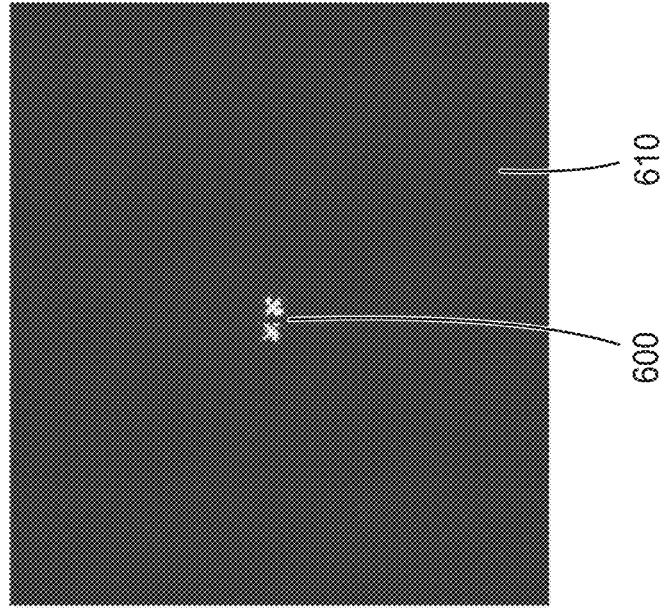
FIG. 6

| | 1 | 2 | 3 | 4 | 5 |
|---|---|---|---|---|---|
| Defect Attributes: | | | | | |
| Paint Type | Dirt nib | Crater | Dirt nib | Dirt nib | Dirt nib |
| | 1K | 1K | 2K | 2K with flex agent | Powdercoat |
| Defect Height (average, µm) | 40 | -15 | | 40 | 50 |
| Defect Area (average, µm^2) | 125000 | 940000 | 125000 | 125000 | 200000 |
| Defect Volume (average, µm^3) | 1200000 | 4000000 | 1200000 | 1200000 | 2000000 |
| Paint Cure Condition | fully cured | fully cured | still curing | still curing | fully cured |
| Orange Peel Level | medium | medium | low | low | high |
| Haze sensitivity | low | low | medium | medium | low |
| others... | | | | | |
| | | | | | |
| Abrasive Disc Type | 464LA-Microreplica | 464LA-Microreplica | 468LA-Microreplica | 468LA-Microreplica | 468LA-Microreplicated |
| Abrasive Disc Grade | A7 | A7 | A5 | A5 | A7 |
| Abrasive Disc Holder Hardness | Firm | Firm | Firm | Firm | Firm |
| Dwell Time | 1.5 seconds | 1.5 seconds | 2 seconds | 1.5 seconds | 3 seconds |
| Force | medium (.75-1.5 lb) | medium (.75-1.5 lb) | low (.25-.75 lb) | low (.25-.75 lb) | low (.25-.75 lb) |
| Force Ramp, if any | constant | "Peak" linear build | constant | constant | constant |
| Speed | 12,000RPM | 12,000RPM | 12,000RPM | 12,000RPM | 12,000RPM |
| Motion - vibe, ro, etc. | 3/16" orbit | 3/16" orbit | 3/16" orbit | 3/16" orbit | 3/16" orbit |
| | | | | | |
| Rotary Buff (Y/N) | N | N | N | Y | Y |
| If Rotary Buff. type | | | | Foam | Foam |
| If Rotary Buff. speed | | | | 3000RPM | 3000RPM |
| If Rotary Buff. pattern | | | | 3 lb, normal to 15 2.5 lb, normal to 15 degree angle | |
| If Rotary Buff. compound type | | | | Polish (3M Finess Polish (3M Finesse-It Finishing Material) | |
| If Rotary Buff. compound amount | | | | Pea sized, 0.4-0.6 | Pea sized, 0.4-0.6 mL |
| If Rotary Buff. dwell time | | | | 10 seconds | 10 seconds |
| | | | | | |
| RO Buff. type | 1/2" Orbit | 1/2" Orbit | 1/2" Orbit | None | 1/2" Orbit |
| RO Buff. hardness | Foam (3M Orange | Foam (3M Orange | Foam (3M Flat Gray 3.5" 28878? | | Foam (3M Orange Waffle 3.25" 02648 |
| RO Buff. pattern | Flat "+" pattern o | Flat "+" pattern o | Flat "+" pattern over area ensuring | | Flat "+" pattern over area ensuring edge of pad works sanded spot |
| RO Buff. speed | 12,000RPM | 12,000RPM | 12,000RPM | | 12,000RPM |
| RO Buff. force | 4 lb, normal | 4 lb, normal | 4 lb, normal | | 4 lb, normal |
| RO Buff. compound type | Polish (3M Finess | Polish (3M Finess | Polish (3M Finesse-It (K211) | | Polish (3M Finesse-It Purple) |
| RO Buff. compound amount | Pea sized, 0.4-0.6 | Pea sized, 0.4-0.6 | Pea sized, 0.4-0.6 mL | | Pea sized, 0.4-0.6 mL |
| RO Buff. dwell time | 12-15 seconds | 12-15 seconds | 14-20 seconds | | 12-15 seconds |

PAINT REPAIR PROCESS BY SCENARIO

CROSS REFERENCE TO RELATED APPLICATIONS

This application is a national stage filing under 35 U.S.C. 371 of PCT/IB2019/057107, filed Aug. 23, 2019, which claims the benefit of U.S. Provisional Application No. 62/801,310, filed Feb. 5, 2019, the disclosure of which is incorporated by reference in its/their entirety herein.

TECHNICAL FIELD

This application is directed to systems and methods for removing defects on or in coated surfaces such that the surface can be repaired and appear uniform. The process is typically performed for parts or surfaces that require improved aesthetics and includes leveling the defects and then further refining the repair area until the repair area has little to no recognizable difference with the surrounding area.

BACKGROUND

Clear coat repair is one of the last operations to be automated in the automotive original equipment manufacturing (OEM) sector. Techniques are desired for automating this process as well as other paint applications (e.g., primer sanding, clear coat defect removal, clear coat polishing, etc.) amenable to the use of abrasives and/or robotic inspection and repair. Additionally, this problem has not been solved in the aftermarket sector.

Prior efforts to automate the detection and repair of paint defects include the system described in US Patent Publication No. 2003/0139836, which discloses the use of electronic imaging to detect and repair paint defects on a vehicle body. The system references the vehicle imaging data against vehicle CAD data to develop three-dimensional paint defect coordinates for each paint defect. The paint defect data and paint defect coordinates are used to develop a repair strategy for automated repair using a plurality of automated robots that perform a variety of tasks including sanding and polishing the paint defect. The repair strategy includes path and processing parameters, tools, and robot choice. Force feedback sensors may be used to control the repair process. Additional tasks may include generating robot paths and tooling parameters, performing quality data logging, and error reporting. However, no details of the repair process are provided. Also, the system applies no pattern matching or machine learning techniques to assist in the identification of the defects or in determining the optimal process for correcting the defect.

US Patent Publication No. 2017/0277979 discloses the use of a pattern classifier in a vehicle inspection system to identify defects from images generated by shining light on a specular surface at a fixed position and measuring the reflected light using a fixed camera. The pattern classifier is trained to improve defect detection results by using the images to build an image training set for a vehicle model and color. The images in the training set are examined by a human or machine to identify which images and which pixels have defects. However, no automated techniques are disclosed for correcting the identified defects.

U.S. Pat. No. 9,811,057 discloses the use of machine learning to predict the life of a motor by observing a state variable comprising output data of a sensor that detects the operation state of the motor and data related to presence or absence of a failure in the motor. A learning unit learns the condition associated with the predicted life of the motor in accordance with a training data set created based on a combination of the state variable and the measured actual life of the motor.

Applicant can find no application of machine learning techniques to identify and to repair paint defects in an automated manner. Also, the prior art systems do not account for variations in the automated processes used by customers to inspect and to correct paint defects. Improved techniques for automating such processes are desired.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

The systems and methods described herein provide techniques for automating the correction of paint defects for all areas of abrasive automation.

The systems and methods described herein address the robotic abrasive processing problem by offering a framework for enabling complete automation of the paint repair process with the option of including inspection/feedback along with the ability to learn new processes and/or adapt to the customer's process deviations. In other words, the systems and methods described herein serve as a digitization of traditional application engineering techniques in a way that stands to revolutionize the way abrasives are consumed by offering cost-effective optimal solutions that are tailored to both the customer's application and a particular abrasive product of the abrasives manufacturer in a way that protects domain-specific knowledge of the customer and the abrasives manufacturer. Though described for providing robotic paint repair, which includes repair of primer, paint, and clear coats, it will be appreciated that the techniques described herein lend themselves to other industrial applications beyond paint repair.

Sample embodiments of a computer-implemented method of providing automated abrasive paint repair as described herein include the steps of receiving coordinates of each identified defect in a substrate along with parameters describing characteristics of each defect, selecting at least one of a sanding process, a buffing process, and a polishing process based on empirically derived rules established by skilled/expert human operators and the received parameters, and instructing automated abrasive paint repair devices to execute the selected at least one sanding process, buffing process, and polishing process using the received parameters. In the sample embodiments, the empirically derived rules and parameters are stored in a lookup table, and parameters are selected from the lookup table using a parameter selection algorithm that implements empirically engineered parametric functions of the received parameters. In other sample embodiments, the empirically derived rules are updated using a machine learning module that runs learning updates to improve future automated abrasive paint repair actions based on a particular identified defect and subsequent evaluation of an executed repair. In such embodiments, a parameter selection algorithm may be used to implements at least one of decision trees, known k-nearest neighbor methods, and machine learning techniques to select the parameters based on a previously executed repair.

In the sample embodiments, the received parameters include a defect type from a classifier, approximate volumetric information describing the defect, and/or substrate material information. The received parameters may also include process parameters such as dwell time or force profile. The received parameters may be measured manually or measured using an automated digital robotic inspection device including a camera.

In the sample embodiments, the automated abrasive paint repair devices are instructed to perform an abrasive step using a selected sanding process using abrasive process parameters followed by at least one buffing/polishing step using a selected at least one buffing process and polishing process using buffing/polishing parameters. In the sample embodiments, the buffing/polishing parameters are selected based on a previously executed repair strategy. The outputs provided to the automated abrasive paint repair devices may include an abrasive type, an abrasive grade, RPMs to use by a sanding tool, orbit to use by a sanding tool, a polishing compound, RPMs to use by a buffing/polishing tool, and/or orbit to use by the buffing/polishing tool. The outputs may also include set points for RPM of a sanding tool, a control input for a compliant force flange, a trajectory of a robot manipulator, and/or total processing time. In such embodiments, the trajectory of the robot manipulator is communicated to the robot manipulator as time-varying positional offsets from an origin of the defect being repaired.

In the sample embodiments, the characteristics of each defect are received from end effect sensors as locally collected in-situ inspection data. The in-situ inspection data may be provided to a machine learning unit for creating learning updates using at least one of fringe pattern projection, deflectometry, and intensity measurements of diffuse reflected or normal white light using a camera. In the sample embodiments, the sanding process and the polishing process include continuous parametric functions for continuous parameters.

In other sample embodiments, at least one abrasive medium and buffing and polishing pad is selected based upon an image of the substrate and the received parameters. Machine learning techniques may also be used to select the abrasive medium and/or buffing and polishing pad based on a previously executed repair. The methods may further include monitoring usage of abrasive media and buffing and polishing pads to signal when change of abrasive media or buffing and polishing pads is recommended.

The methods are implemented by an automated abrasive paint repair system including automated abrasive paint repair devices that selectively perform at least one of sanding, buffing, and polishing a substrate in response to received instructions, and a controller having one or more processors that execute instructions to generate the instructions to control the automated abrasive paint repair devices. The controller includes processors that executed instructions to implement the steps of receiving coordinates of each identified defect in the substrate along with parameters describing characteristics of each defect, selecting a sanding process, a buffing process, and/or a polishing process based on empirically derived rules established by skilled/expert human operators and the received parameters, and providing the instructions to the automated abrasive paint repair devices to execute the selected sanding process, buffing process, and/or polishing process using the received parameters. In the sample embodiments, a lookup table that stores the empirically derived rules and parameters, and the controller implements a parameter selection algorithm that selects parameters from the lookup table according to empirically engineered parametric functions of the received parameters. In other sample embodiments, the empirically derived rules are updated using a machine learning module that runs learning updates to improve future automated abrasive paint repair actions based on a particular identified defect and subsequent evaluation of an executed repair. In such embodiments, a parameter selection algorithm may be used to implements at least one of decision trees, known k-nearest neighbor methods, and machine learning techniques to select the parameters based on a previously executed repair. The controller further includes instructions for implementing the other steps of the method as described herein.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 6 illustrates local curvature computation output from deflectometry of two defects (pre-sanding)

FIG. 9 illustrates an example empirically derived lookup table generated from existing process know-how specifically for the task of paint repair.

DETAILED DESCRIPTION

Figure 1:
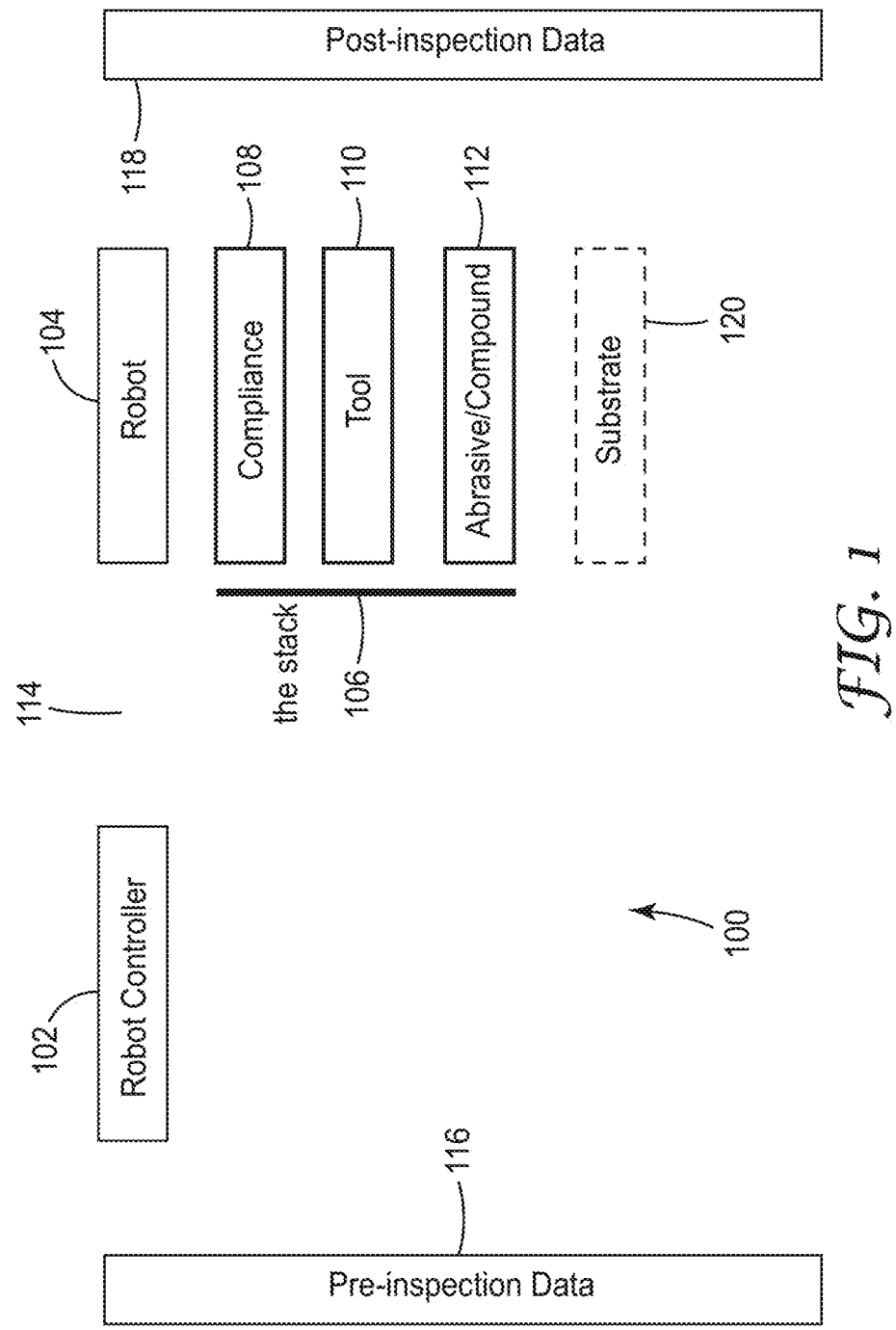
FIG. 1 is a schematic illustrating robotic paint repair hardware for OEM and aftermarket applications.

It should be understood at the outset that although an illustrative implementation of one or more embodiments are provided below, the disclosed systems and/or methods described with respect to FIGS. 1-22 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Overview

Systems and methods are described for automating the process of repairing defects for paint applications using automated abrasive processing and subsequent polishing. The systems and methods include novel combinations of robotic (smart) tools and/or part handling, sensing techniques, stochastic process policy that results in desired system behavior based on current part/system state and provided feedback, and an optional learning component capable of optimizing provided process policy, continuously adapting the policy due to customer's upstream process variations, and/or teaming the process policy from scratch with little-to-no human intervention.

Generally, the systems and methods described herein implement automated abrasive processing. Though described in sample embodiments with respect to automotive clear-coat/paint repair, it will be appreciated by those skilled in the art that the systems and methods described herein are applicable to other industrial applications beyond paint repair. In sample embodiments, the automated abrasive processing techniques described herein exhibit the following characteristics:

1. Robotic (smart) tool and/or part handling;
   Utilization of advanced abrasive systems (e.g., 3M's Finesse-it™);
   The ability to handle multiple input modalities including raw pixel data of part/defects, preidentified defect locations (with surface normal information), and preidentified defect classifications and corresponding metrics (e.g., severity);
   The ability to implement a range of process selection sophistication ranging from simple empirically derived policies to self-learned stochastic policies using machine/reinforcement learning; and
   The ability to work within confines of existing industrial control infrastructure or have total control of abrasive process hardware/equipment including robotic manipulation, end effector/tooling, pre/post imaging, and in-situ sensing.

Recent advancements in end effector compliance/force control have made feasible the total automation of automotive clear coat repair. In particular, active and high-dynamic pneumatic compliant force control flanges now exist that enable robotic systems to exhibit the force/pressure fidelity required for sensitive abrasive operations (i.e., clear coat repair via sanding, buffing, and subsequent polishing). Previously, through-the-arm force control using a force/torque sensor at the tool in conjunction with the robot's controller were the accepted method; however, this approach suffers from poor response times and very stiff response curves thus eliminating them as an acceptable solution for this application domain.

The aforementioned tooling (referred to in FIG. 1 below as stack 106) comprises any abrasive tooling and articles along with any ancillary equipment such as (compliant) force control. The stack 106 is more or less synonymous with the term end effector; however, the term stack is used herein in the context of robotic abrasive finishing. FIG. 1 further breaks down an example stack 106 schematically.

Recent advancements in computational power have made feasible the process of clear coat inspection at production speeds. In particular, stereo deflectometry has recently been shown to be capable of providing paint and clear coat defects at appropriate resolution with spatial information to allow subsequent automated spot repair. Using conventional inspection methods, an automated clear-coat spot repair system 100 in a sample embodiment might look like the schematic drawing of FIG. 1 for OEM applications. In FIG. 1, the respective boxes represent various hardware components of the system including robot controller 102, robot manipulator 104, and robotic paint repair stack 106 including compliance force control unit 108, tooling 110, and abrasive articles/compounds 112. The flow of data is depicted by the background arrow 114 which starts with pre-inspection data module 116 that provides inspection data including identified defects in the substrate and ends with post-inspection defect data module 118 for processing data generated from the substrate 120 during the defect repair process.

In a sample embodiment, substrate 120 may be the car body itself, and the finish can be any state of the car throughout the entire manufacturing process. Typically, the car or panels of interest have been painted, clear-coated, and have seen some form of curing (e.g., baking) and are checked for defects. In operation, the defect locations and characteristics are fed from the pre-inspection data module 116 to the robot controller 102 that controls robot manipulator 104 on which a program guides an end effector (stack) 106 to the identified defect to execute some pre-determined repair program (deterministic) policy. In some rare cases, the policy might be able to adapt depending on the provided defect characteristics.

For paint repair applications, the robotic paint repair stack 106 comprises abrasive tooling 110 and abrasive articles and compounds 112 along with any ancillary equipment such as (compliant) force control unit 108. As used herein, the robotic paint repair stack 106 is more or less synonymous with the term end effector; however, in this document the term "stack" is the end effector in the context of robotic paint repair. Also, though described for providing robotic paint repair, which includes repair of primer, paint, and clear coats, it will be appreciated that the techniques described herein lend themselves to other industrial applications beyond paint repair.

Figure 2:
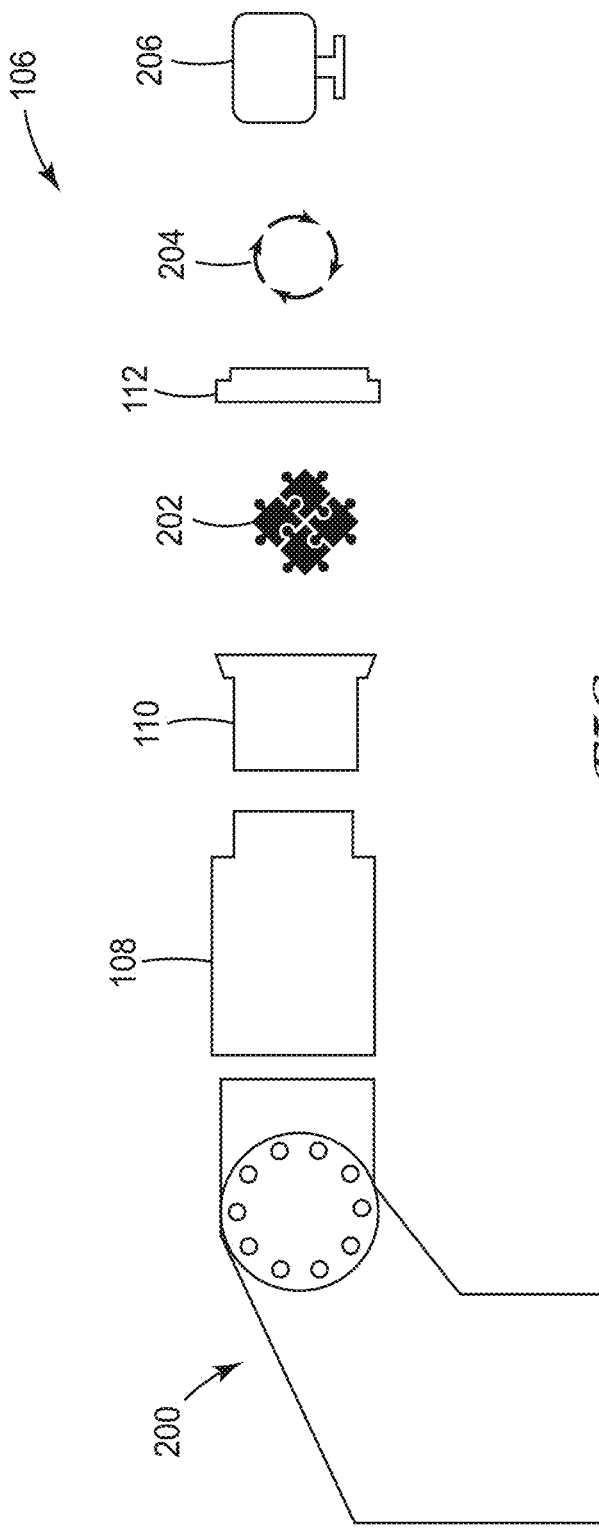
FIG. 2 illustrates the components of a robotic paint repair stack broken down schematically.

FIG. 2 illustrates the components of the robotic paint repair stack 106 broken down schematically. As illustrated, the robotic paint repair stack 106 comprises a robot arm 200, force control sensors and devices 108, a grinding/polishing tool 110, a hardware integration device 202, abrasive pad(s) and compounds 112, a design abrasives process 204, and data and services 206. These elements may work together to identify defect locations and to implement a predetermined repair program using a deterministic policy for the identified defect.

FIG. 1 and FIG. 2 thus implement the rather straightforward approach of automating clear-coat repair based on newly available inspection methods (i.e., deflectometry). The embodiments of the systems and methods described below differentiate from the system and method of FIG. 1 and FIG. 2 by utilizing additional data from the inspection, work-cell, or tooling to modify in real-time on a per-defect basis the robotic program (i.e., policy) for the repair. In this respect, the program adapts based on observations to execute an optimal (or near-optimal) repair strategy (policy) that is on the spectrum between a deterministic empirically-derived recipe (tech service/application engineering) and a stochastic policy that is constantly improved based on performance (i.e., reinforcement learning). Additionally, other forms of learning may be applied such as classification (supervised learning) or clustering (unsupervised learning) to help perform dimensionality reduction on the sensing data or the like. These approaches together comprise a learning module that will be described with respect to a sample embodiment below.

Sample Embodiment

Despite advances in tooling, there is still a general lack of understanding/experience on how to program the system described with respect to FIG. 1 and FIG. 2 to use abrasives effectively. A successful implementation requires expertise in both robotic integration/programming and domain-specific abrasive utilization. The techniques described herein address this issue by providing a complete automation solution that is capable of selecting and executing optimal abrasive utilization/techniques for the task at hand, requiring no expert knowledge on the user's behalf. In the context of automotive paint repair this involves taking in defect information (e.g., images and/or locations, descriptions, etc.) and computing a defect-specific, abrasive-specific repair strategy. The techniques may be implemented in a number of various instantiations depending on types of inputs and total breadth of control/execution allotted to the application controller. A representative embodiment is shown schematically in FIG. 3.

Figure 3:
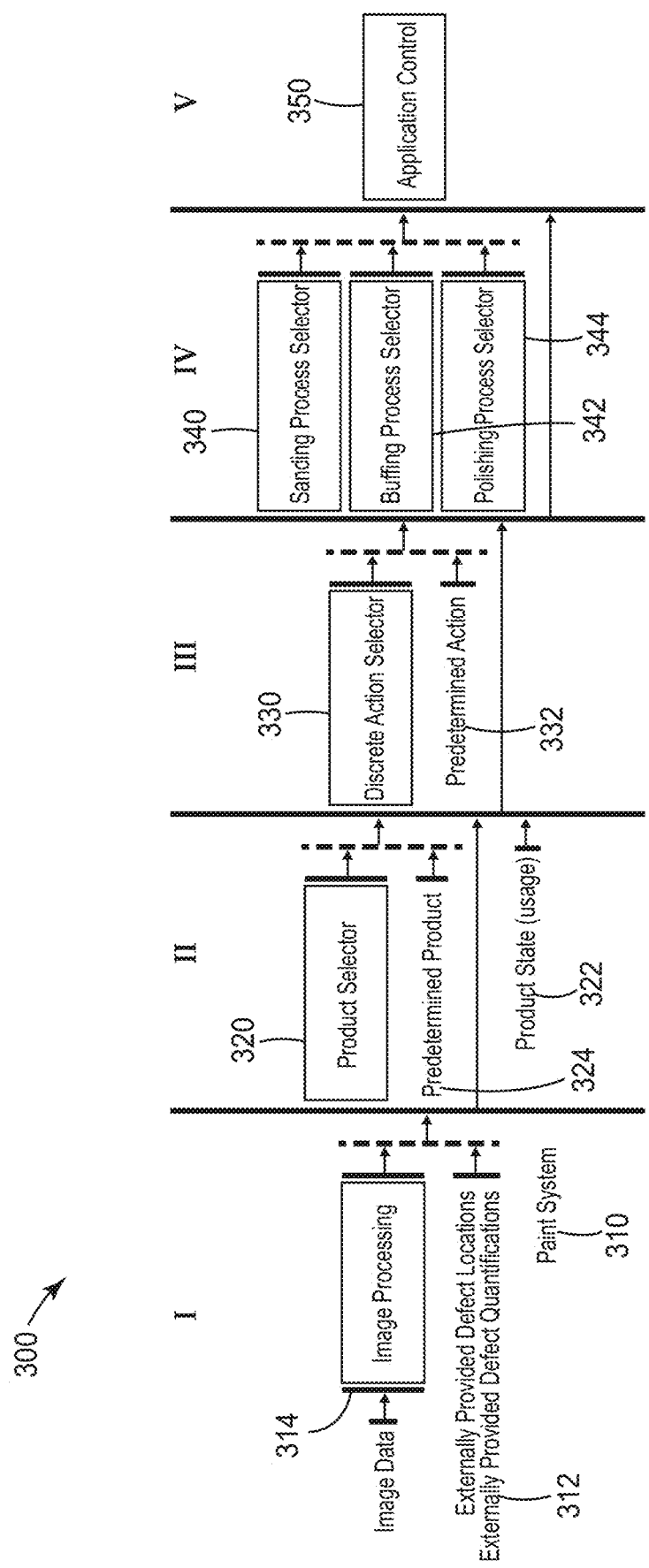
FIG. 3 is a schematic illustrating a sample embodiment of a process implemented by a controller for controlling the automated abrasive paint repair devices to provide automated abrasive paint repair.

FIG. 3 is a schematic illustrating a sample embodiment of a process 300 implemented by a controller having at least one processor programmed to control the automated abrasive paint repair devices to provide automated abrasive paint repair as described herein. In FIG. 3, the data flows from left to right as depicted by the arrows. The solid and dashed vertical bars depict collections of data or choices between inputs, respectively, and can be thought of as busses (solid) and multiplexer (dashed). The boxes represent modules, each of which is explained in detail below. As illustrated, the process 300 generally comprises five main stages (I-V) separated by the tall solid lines. Each of these stages will be described below.

Stage I

In the first stage (Stage I), the process 300 collects relevant information regarding the particular instance of paint defect repair. In particular, the process takes in relevant information 310 regarding the paint system in use such as paint layers (e.g., order, composition, etc.) along with data 312 describing the defect locations and defect quantifications of the defects to be repaired. The defect data can be presented in a number of different forms to accommodate integration into various control architectures and plant infrastructure. In the simplest case, the manufacturer provides minimal information of the defects from their own (pre-existing) inspection method. This can be manual, automated, or some combination of both. In general, the process 300 uses at least the location of the defect (with surface normal information) along with some measure of the defect itself. The more descriptive these features are, the better the defect can be processed by the sanding, buffing, and polishing process selectors described below with respect to the fourth stage (Stage IV).

The process of FIG. 3 is flexible enough to work with any information available including current human-centric standards used in the industry today. Such standards are generally proprietary in nature and change on a per-manufacturer basis but share many of the same underlying characteristics. As an alternative to taking in supplied external information, the process of FIG. 3 can take in digital information in a spectrum of forms ranging from raw pixel data of defect images to height or curvature maps from an imaging processing system 314 that provides such images (e.g., stereo deflectometry).

Figure 4:
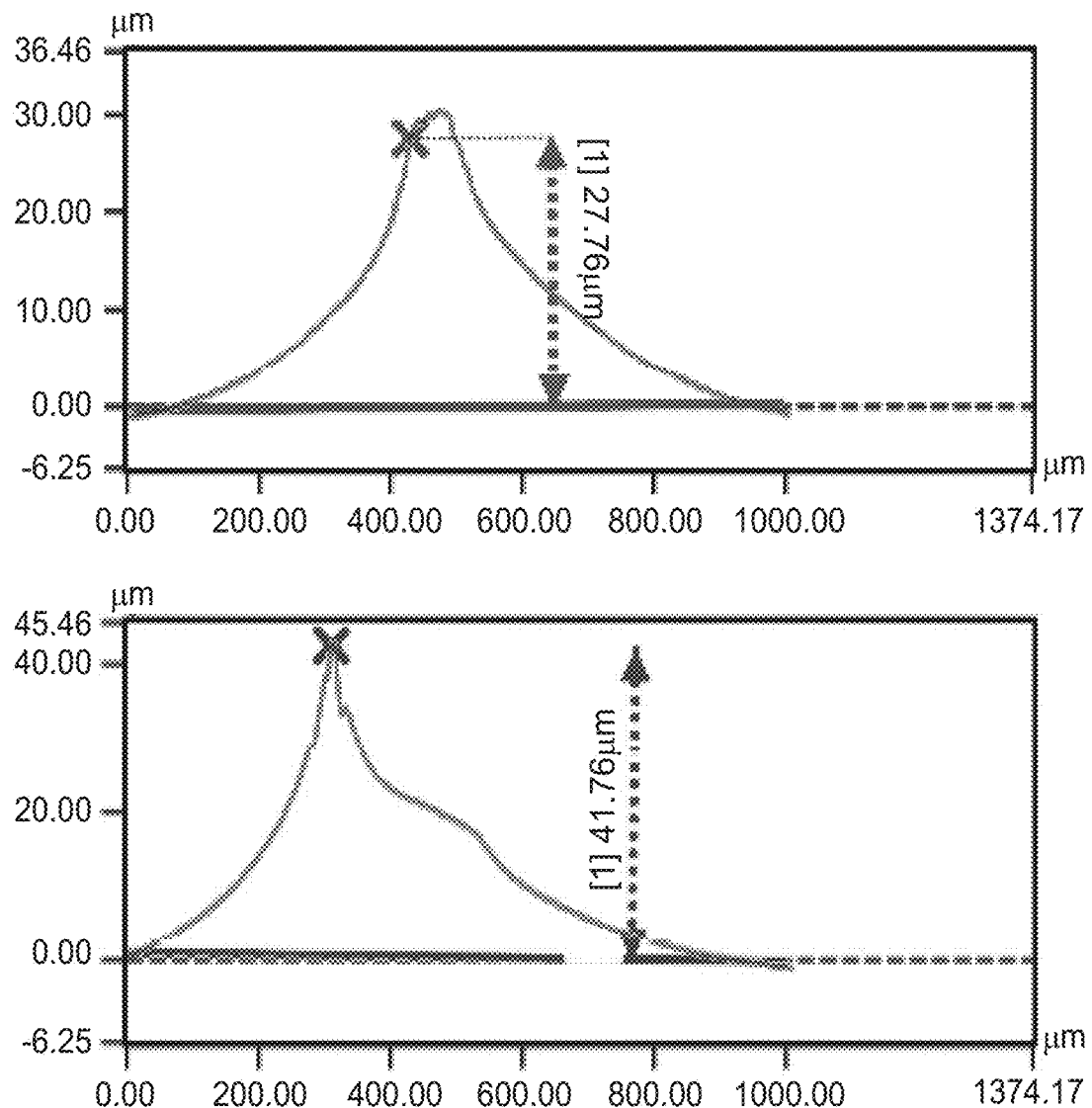
FIG. 4 illustrates the profiles of two separate raised "nib" defects.

The process 300 described herein has the ability to take in pre-existing/provided defect information in some form that includes location and characteristic information. For example, FIG. 4 illustrates the profiles of two separate raised "nib" defects. A preferred mode of input, however, is in the form of data-rich image inputs such as height maps or even raw image data (e.g., in the case of the popular deflectometry methods the raw images of the phase shifted defections) from image processing system 314. In this latter case, the process 300 is able to make better decisions on how to most effectively repair the defects and even locate/identify them in an automated fashion. While it may seem that pre-processed inputs are more meaningful, it is often the case that the features were constructed with a priori assumptions that might be incorrect or sub-optimal for the chosen abrasive product/system. For example, a common human-centric method of describing defects is by a type classification along with some measure of severity. However, this provides little information on how the abrasive will perform in this particular case and thus an optimal repair solution is impossible.

Figure 5:
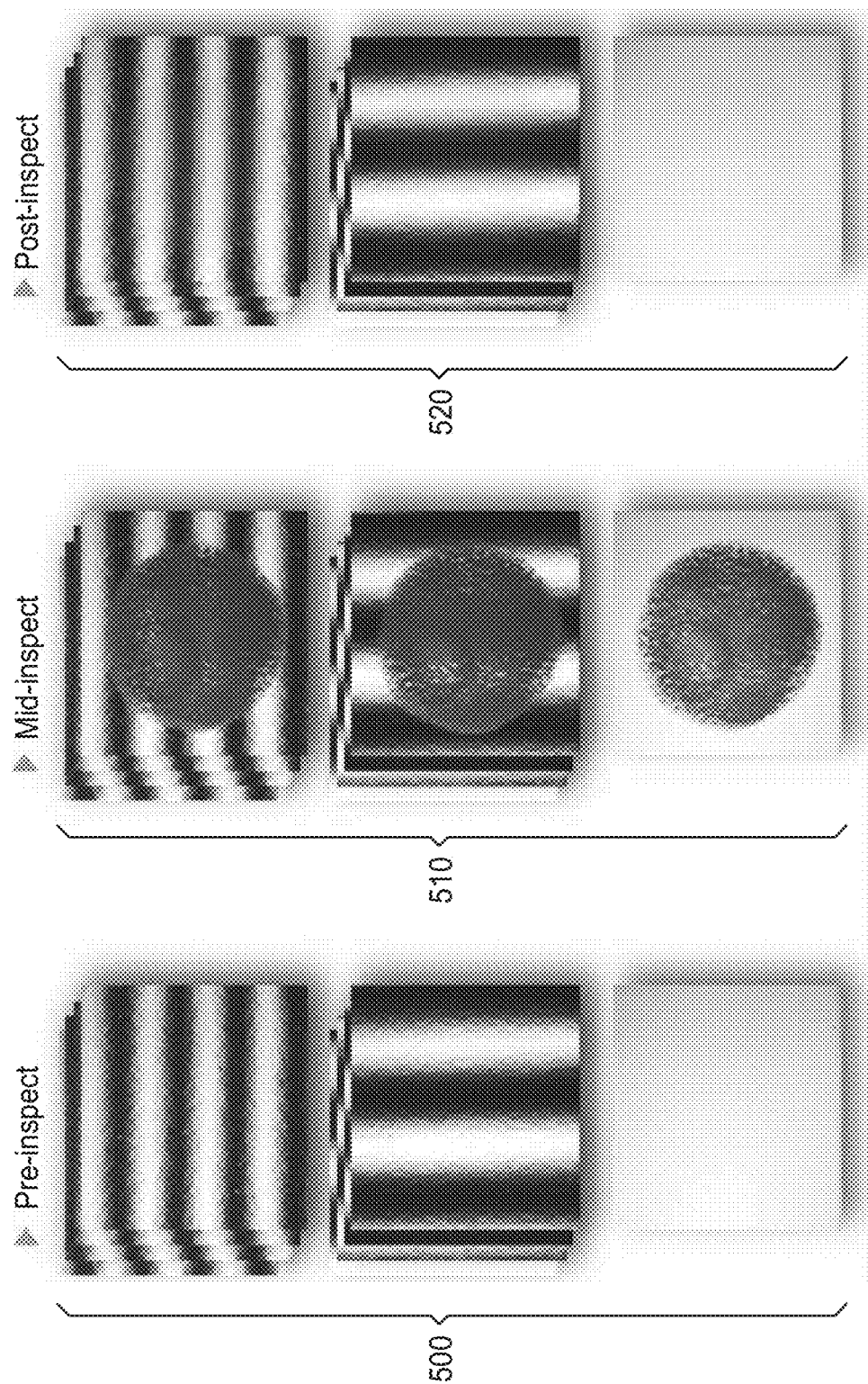
FIG. 5 illustrates multi-modal images taken during pre-sanding (left), post-sanding/pre-polishing (center), and post-polishing (right).

As a sample embodiment of fully integrated image processing, FIG. 5 shows raw pixel data at each of the pre-repair, post-sanding, and post-polishing stages of the Finesse-it™ repair process provided by 3M Corporation. In particular, FIG. 5 illustrates multi-modal images taken during pre-sanding (left) 500, post-sanding/pre-polishing (center) 510, and post-polishing (right) 520. The top two rows of images are the unprocessed deflectometry phase-shifted image captures for specular regions, while the bottom row is a single solid-white-illuminated image for diffuse regions. The phase shifted deflection images allow for high-precision inspection of specular surfaces (four shifted horizontally and four shifted vertically) while the normal image captured with diffuse white lighting is useful for observing features of diffuse surfaces.

Figure 7:
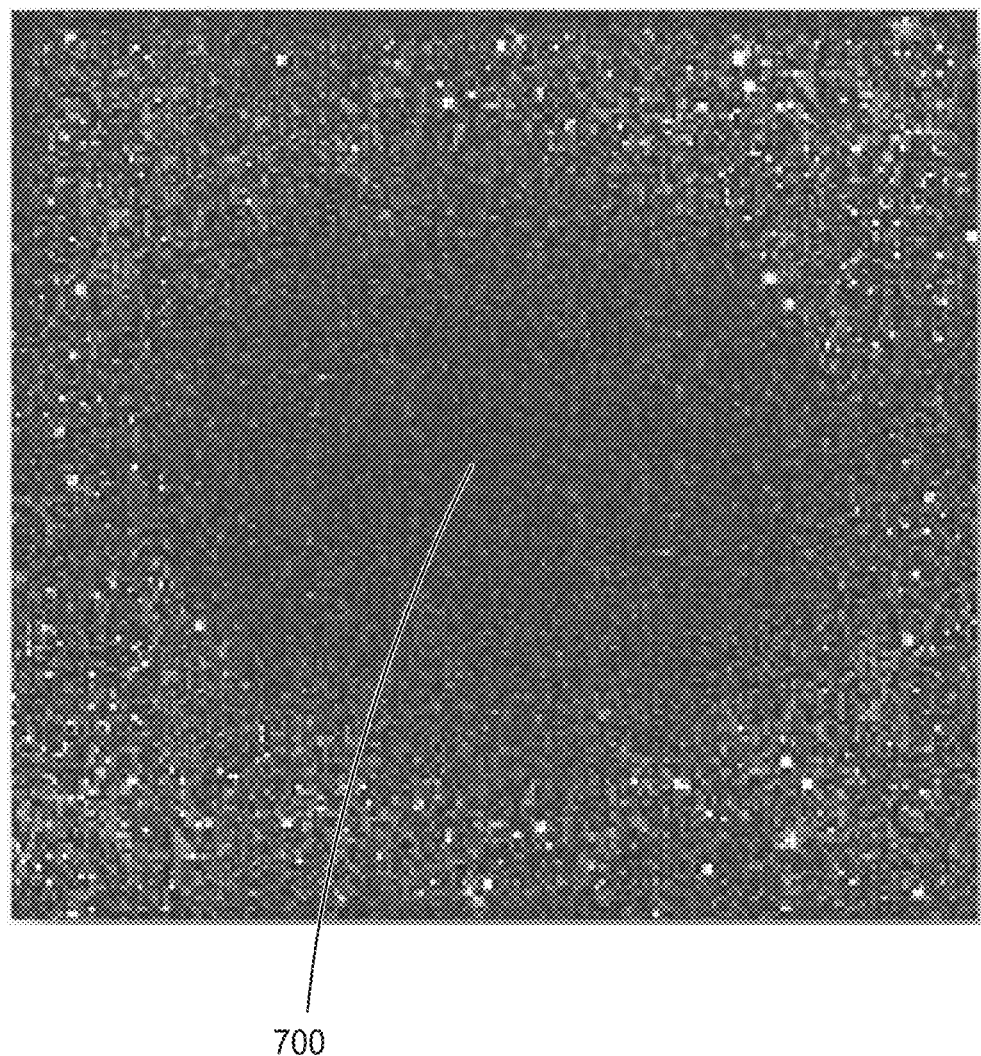
FIG. 7 illustrates curvature output from an overly processed region.

FIG. 6 and FIG. 7 show a possible output of the image processing using local computed curvature. FIG. 6 illustrates local curvature computation output from deflectometry of two defects (pre-sanding). The areas 600 are of higher curvature than the remaining areas 610. Here the areas 600 are raised "nib" defects that are readily apparent with two in the left image and one large one in the right image. FIG. 7 illustrates curvature output from an overly processed region 700. Here the repair was too aggressive and results in non-uniform post-repair surface topography. The repair will remove any present defects while maintaining the large-area defect-free appearance of the part. Other possible implementations include automated classification and/or implicit feature extraction via something like a convolutional layer of a neural network as described below with respect to the fourth stage (Stage IV).

Figure 8:
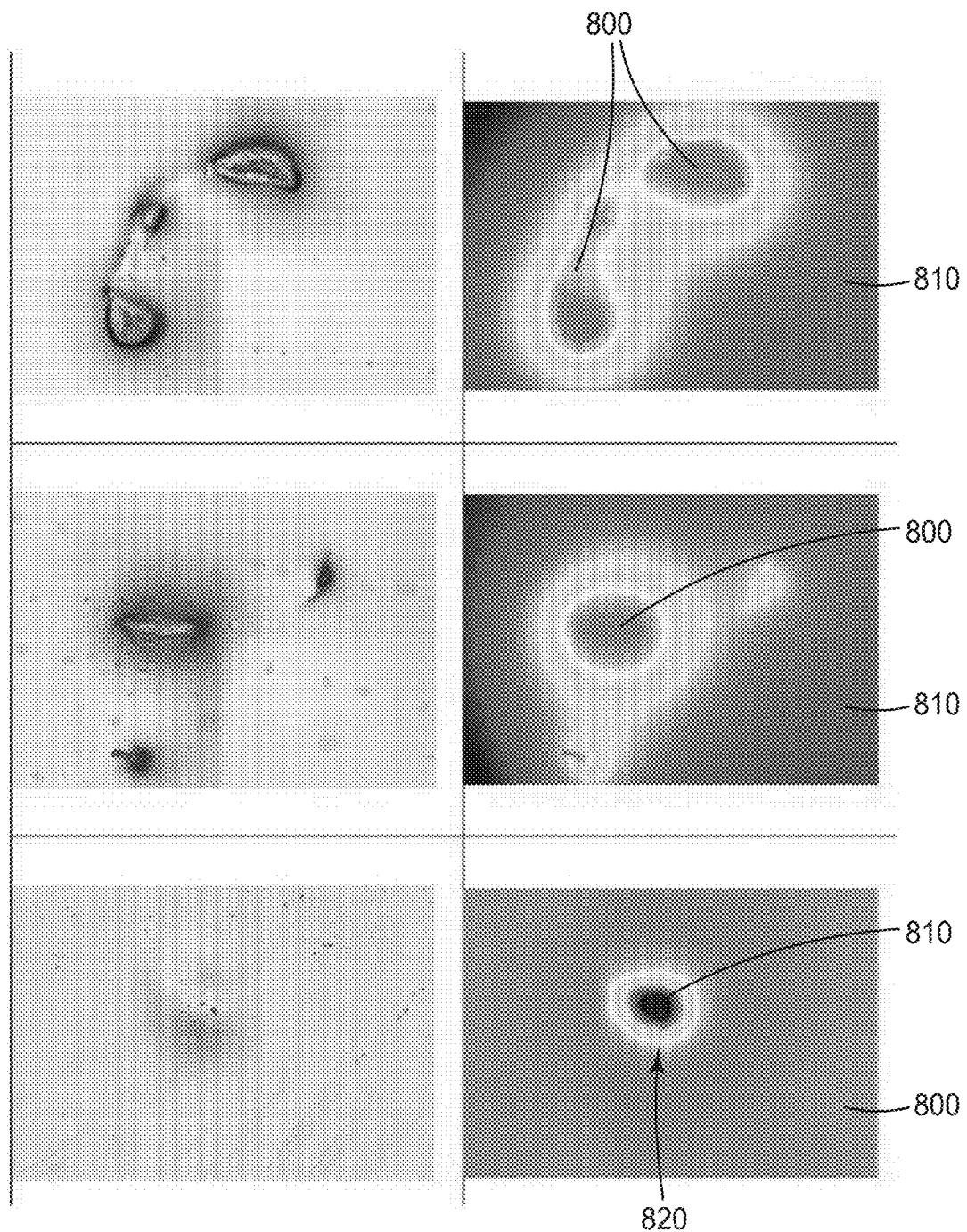
FIG. 8 shows height maps taken using laser profilometry representing the use of laser imaging to measure a height map.

FIG. 8 shows height maps taken using laser profilometry representing the use of laser imaging to measure a height map. Here the regions 800 are higher than the regions 810. An example of an inverted "crater" defect 820 can be seen in the bottom row of FIG. 8.

Stage II

The second stage (Stage II) of the process 300 is an optional stage that allows for the utilization of an optimal product selector module 320. Given the application domain and relevant specifics such as product state 322, the product selector module 320 provides the optimal abrasive product selection for the process at hand. The product selection by the product selector module 320 can be based not only on the domain specifics but also on a per-part basis such as the defect information itself in this case. For example, larger, more severe defects might warrant more aggressive abrasives. The process 300 defaults to using pre-determined product selection 324 if the product selector module 320 is not present/available.

In sample embodiments, the product selector module 320 is a digital tool that provides the ability to look at a given finish, define it by sight, and then to provide recommended solutions for abrasive processes to achieve the desired end state finish. The product selector module 320 may use digital images and may include additional descriptors of application requirements or process conditions. The digital images may be collected via cellular camera and solutions may be provided on a mobile device. The algorithms driving the tool incorporate application engineer expertise from a broad range of end-user applications to inform and refine the image analysis and recommended options for abrasive process solutions. The product selector module 320 may be used in an iterative method of multi-step processing.

End-user visits for abrasive applications generally include review of a workpiece to show the desired end finish. "End finish" applies to the appearance of workpieces at final production stage, the penultimate step before further painting, plating or coating the workpiece, or an intermediate step of a larger manufacturing process. In many cases the end-user has limited measurements available to quantify the finish. Most often there are no measurements to define the quality of the finish and the final inspection by visual means (e.g., by eye). The finish appearance is a complex combination of workpiece features (material, coatings, color, scratch depth/shape/concentration, etc.) with the lighting conditions (reflectivity, brightness, etc.) While the human eye captures many attributes of the total appearance, even a "trained eye" identifying defects or imperfections is highly subjective. Additionally, it is difficult for persons to accurately describe the total appearance such that it is fully understood by a "novice eye" or a person not looking directly at the workpiece under the same lighting conditions. The product selector module 320 minimizes these subjective factors by creating a digital capture of the visual field including the possible defect to feed into the product selector module 320.

The end finish is also a product of the sequence of abrasive operations. The poor selection of abrasive type, grade and/or process conditions can lead to several undesired situations such as unwanted features in the final finish (such as a deep scratch in a mirror or near mirror finish) requiring rework of the workpiece, and too much material removal leading to scrapping of the workpiece (waste). Often, an overly cautious operator will take an approach that uses less aggressive abrasive steps/finer grades and sacrifices productivity to minimize final waste or head off rework. The product selector module 320 draws on the extensive expertise of application engineers in multi-step abrasive processing to suggest solutions.

An application engineer starts the process assessment by the product selector module 320 with general factors affecting performance and then suggests parameters to optimize an existing process or recommend new process solution. The product selector module 320 draws on prior examples, via the finish in the digital images, to make recommendations. Additional images, parameters and equipment information from applications can be inserted on an ongoing basis to further teach the product selector module 320 how to move from classification or clustering to a prediction output.

The product selector module 320 thus creates structured data to customer needs (finish) that have been difficult to describe. Product selector module 320 may implement a machine learning algorithm that enhances planning and execution of robotic applications. Product selector module 320 may also generate a prediction of finish output from operating parameters. The product selector module 320, if provided, thus enables an improved quality and speed of proposing abrasive solutions, and an improved effectiveness of more novice employees (sales or application engineers) who have limited experience in the breadth of customer abrasive applications.

Stage III

The third stage (Stage III) of the process 300 includes a discrete action selector module 330 that handles the choice of discrete actions including changing and/or tending the abrasive products. It is sometimes the case that abrasive articles can be used for more than one repair; however, performance in general degrades over time. This prevents a tradeoff and requires a subsequent decision that must be made regarding when to change the abrasive disc. A new abrasive might cut better but the cost of the abrasive itself and the time-incurred cost of changeover is often considered.

Due to the finite useful life of any abrasive media, periodic abrasive changes are required to maintain sufficient performance over time. Depending on the application, usage, and abrasive itself, time between changes can vary. The discrete action selector module 330 has as its main job signaling to the process 300 when a change of abrasive is warranted. Additionally, many abrasive operations utilize some form of supplemental fluids or the like. The discrete action selector module 330 also handles when to and/or how much of the supplemental fluids to use. This logic also applies to buffing and polishing where the pads need to be changed as well, although in general such pads are changed much less frequently. New pads require conditioning and used pads require continual reapplication of polish.

In the context of clear coat/paint repair sanding, the discrete action selector module 330 takes in data regarding current disc usage (e.g., applied force over time) and optionally takes in information regarding the upcoming repair and outputs a set of actions including change disc/do not change disc, amount of supplemental fluid application, etc.

In some cases, for various reasons, the discrete action decisions are predetermined empirically based on manufacturing preferences. If so, such predetermined actions are provided at 332. For example, one policy is to change the abrasive out after every defect. This is in general suboptimal as many abrasive products exhibit lifetimes that last well beyond a single repair. That said, there is value in utilizing optimal decisions that utilize the entire useful life of the abrasive without significantly altering performance (i.e., final quality of repair). The discrete action selector module 330 in its most advanced form considers the cost (in both time and money) of an abrasive change and decides accordingly.

Stage IV

The fourth stage (Stage IV) is where the actual usage strategy of the abrasive is computed. In the context of paint repair, this amounts to selecting values of processing time, disc speed, disc motion, applied force, etc. The chosen module (sanding process selector module 340, buffing process selector module 342, or polishing process selector module 344) corresponds to the current stage of processing (i.e., sanding, buffing, or polishing). In general, outputs of this stage can be scalar values or time-varying functions depending on the sophistication of the method employed.

The process selector modules 340, 342, and 344 are chosen based on the current stage of repair. For example, the first pass of the repair process will invoke the sanding process selector module 340 with subsequent passes then (eventually) selecting the buffing process selector module 342 and the polishing process selector module 344. In the general case, the entire repair process is multi-step and can be iterative. There is no restriction on order and number of times each process selector is chosen. In this respect, iterative repair strategies are obtainable (although not always desirable due to their longer processing times).

Empirically Derived Lookup Tables

The most straightforward approach to implementing these process selectors is from existing empirical domain expertise and process knowledge. This information can be captured in a number of different ways included via lookup tables or machine learning techniques such as imitation learning. FIG. 9 illustrates an example empirically derived lookup table 900 generated from existing process know-how specifically for the task of paint repair. Based on the paint system, defect type, defect measures, and surrounding appearance near the defect, an appropriate repair strategy is recommended. Such tables generally bin the inputs into interval ranges when possible/appropriate. Other options are to record many different known discrete strategies and interpolate using the task at hand.

The values stored in the empirically derived lookup table 900 may then be used to identify the defect type and to use the measured parameters to determine the appropriate sanding, buffing, and polishing tools and procedures to apply to the defect. For example, sample pseudo-code for processing the stored empirically derived parameters may look like the following:

```
Switch defect type:
  Case nib:
    [abrasive_type,
      abrasive_grade,
      abrasive_dwell,
      abrasive_force_profile,
      abrasive_rpm,
      abrasive_orbit]=nib_abrasive_lookup(volu-
        metric_info,
        substrate_info)
    [polish_compound,
      polish_dwell,
      polish_force_profile,
      polish_rpm,
      polish_orbit]=polish_lookup(substrate_info
        abrasive_type,
        abrasive_grade,
        abrasive_dwell,
        abrasive_force_profile,
        abrasive_rpm,
        abrasive_orbit)
  Case crater:
    [abrasive_type,
      abrasive_grade,
      abrasive_dwell,
      abrasive_force_profile,
      abrasive_rpm,
      abrasive_orbit]=crater   abrasive_lookup(volu-
        metric_info,
        substrate_info)
    [polish_compound,
      polish_dwell,
      polish_force_profile,
      polish_rpm,
      polish_orbit]=polish_lookup(substrate_info
        abrasive_abrasive,
        abrasive_grade,
        abrasive_dwell,
        abrasive_force_profile,
        abrasive_rpm,
        abrasive_orbit)
    . . .
  Case default:
    [abrasive_type,
      abrasive_grade,
      abrasive_dwell,
      abrasive_force_profile,
      abrasive_rpm,
      abrasive_orbit]=default   abrasive_lookup(volu-
        metric_info,
        substrate_info)
    [polish_compound,
      polish_dwell,
      polish_force_profile,
      polish_rpm,
      polish_orbit]=polish_lookup(substrate_info
        abrasive_abrasive,
``` abrasive_grade,
abrasive dwell,
abrasive_force_profile,
abrasive_rpm,
abrasive_orbit)

In sample embodiments, the methods implemented automated abrasive paint repair strategies and programs from empirically derived rules from skilled/expert human operators. As indicated in FIG. 9, the empirically derived parameters provided as inputs may include:

1. A defect type from a provided classifier. Sample defect types include nib, crater, drip, run, hair, etc.
2. Approximate volumetric information of the defect. Samples includes any/all of height, width, aspect ratio, etc.
3. Substrate material information. Samples include any/all of type, material, hardness, etc.

In the sample embodiments, provided process parameters may include dwell time, force (profile), and the like.

As noted herein, these inputs may be measured manually or may be measured using automated digital robotic inspection (i.e., cameras). In the sample embodiments, the resulting automated abrasive paint repair includes an abrasive step followed by one or more buffing/polishing steps in which the process selector modules 340, 342, and 344 first generate abrasive process parameters and then polishing parameters, whereby the polishing parameters are chosen with the previously generated/executed repair strategy taken into account. In a first embodiment, the process selector modules 340, 342, and 344 select parameters from empirically derived lookup tables of the type illustrated in FIG. 9 using parameter selection algorithms that are empirically engineered parametric functions of the inputs. In alternative embodiments, the parameters may be selected by parameter selection algorithms that implement decision trees and/or known k-nearest neighbor methods and/or the parameter selections are generated with machine learning techniques (i.e., classification and/or regression) as described in more detail below.

The resulting abrasive-specific outputs may include the abrasive type (product/family), abrasive grade, RPMs to use by the sanding tooling, orbit, and the like. The resulting polish-specific outputs may include compound, RPMs to use by the buffing/polishing tooling, orbit, and the like. In the case of the paints, the inputs may include the substrate cure level, the orange peel measurement, haze sensitivity, and the like.

The results of such a process may specify the standard operating procedure for a two- or three-step paint defect repair system. For example, the first step may specify the sander tool and pad to use as well as the appropriate abrasives. The user would be provided with sanding instructions and tips for the best practices for the selected sanding tools and pads. The second step may specify the polishing tool and pad to use as well as the recommended polish. The user would be provided with buffing instructions and tips for the best practices for the selected buffing tools and pads. In a three-step repair system, the third step may specify the buffing tool and pad as well as the recommended polish to us. The user would be further provided with buffing instructions for the best practices for the selected buffing tools and pads.

Machine Learning Process

Figure 10:
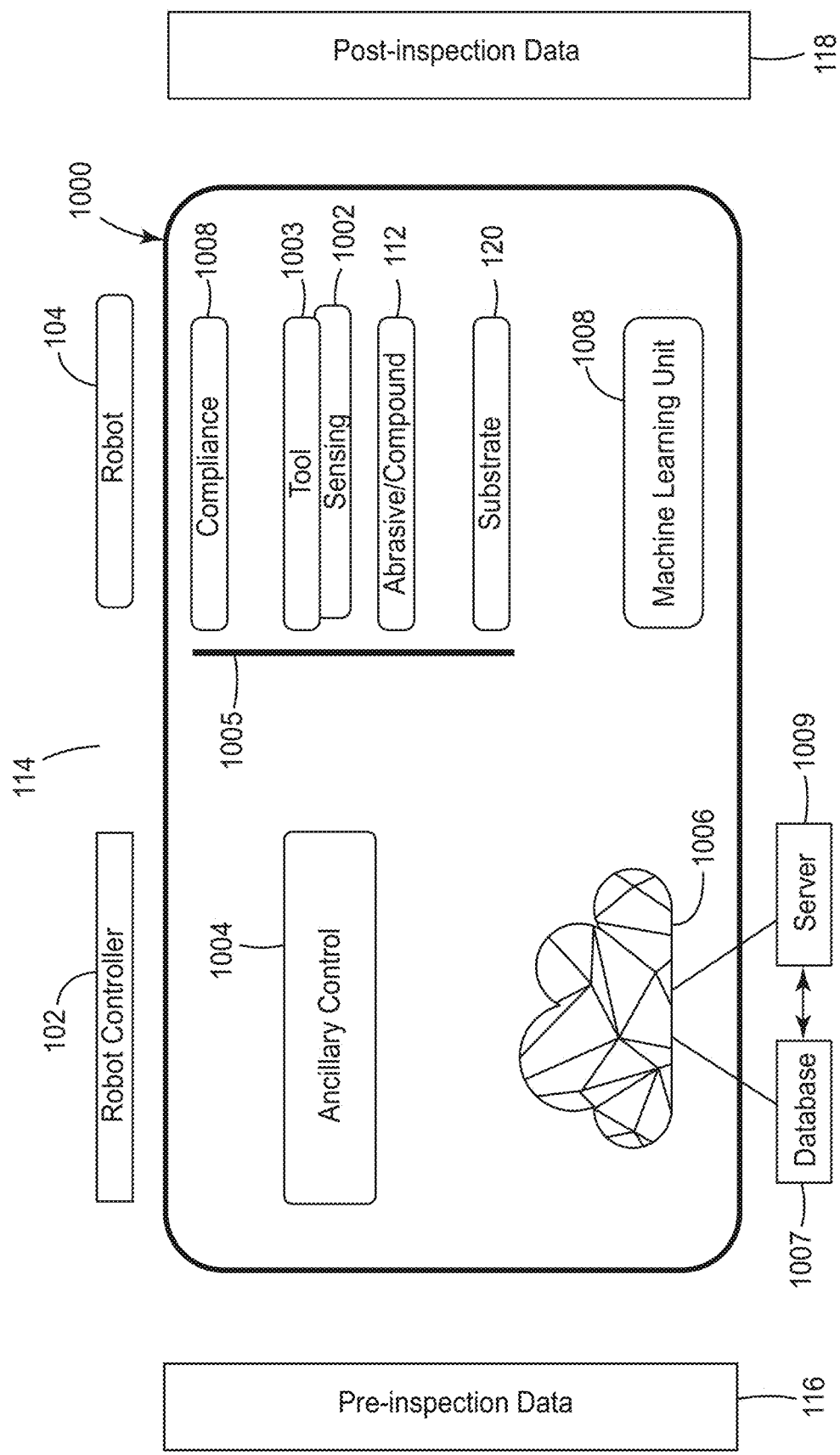
FIG. 10 illustrates robotic paint repair including a learning component and cloud-based process planning and optimization in accordance with a sample embodiment.

In other embodiments, a full end-to-end machine learning technique can be applied in the process selector modules 340, 342, and 344. For example, FIG. 10 illustrates a sample embodiment of a robotic paint repair system including a learning component and cloud-based process planning and optimization. In the embodiment of FIG. 10, the robotic paint repair stack 1000 has been augmented from the robotic paint repair stack 106 discussed above to further include additional sensors 1002, smart tooling 1003, ancillary control unit 1004, and a cloud computing system 1006 including a database 1007 that is local or maintained in the cloud computing system 1006 and is responsible for executing and maintaining the control policy for the paint repair stack 1000 including those policies and procedures recommended by a machine learning unit 1008 and maintained by policy server 1009. The database 1007 and policy server 1009 may be in the cloud or in local on-site servers or edge computers.

The ancillary control module 1004 takes the place of the deterministic code previously residing in the robot controller 1002 and provides the immediate real-time signals and processing for execution of the robot manipulator 1004 and smart tooling 1003. In this regard, the robot manipulator 1004 now serves a reactionary role in the system 1000 driven by the ancillary controller 1004. The database 1007 of the cloud computing system 1006 serves as a long-term data repository that stores observations of processing including state variables, measurements, and resulting performance that are correlated with identified defects to generate policies implemented by the policy server 1009. Finally, the machine learning module 1008 is responsible for continuously improving the repair policy based on observations (state/sensor data) and subsequent reward (quality of repair). Online learning is accomplished by a form of reinforcement learning such as Temporal Difference (TD) Learning, Deep Q Learning, Trust Region Policy Optimization, etc.

In the embodiment of FIG. 10, the robot manipulator 104 is capable of sufficiently positioning the end effector (stack) tooling 1005 to achieve the defect inspection and repair described herein. For the problem domain (primer/paint/clearcoat repair) described herein with respect to sample embodiments, the defects are generally on the outer surface of a substrate 120 (an assembly of multiple shaped pieces of sheet metal, plastics, carbon fiber, etc.) which generally exhibits 2D-manifold structure (i.e., it is locally "flat" or "smooth"). While lower degree of freedom systems could be used in theory, industry-standard six degree of freedom serial robot manipulators have been found to be the best fit for this process. Some examples include Fanuc's M-20 series, ABB's IRB 1600, or Kuka's KR 60 series. For example, the Kuka KR 60 HA has 6 axes and degrees of freedom, supports a 60 kg payload, and has a 2.033 m reach. Process-specific tooling (i.e., the end effector) is covered in more detail in the description of the stack 1005 below.

The robot controller module 102 is the robot OEM provided controller for the selected robot manipulator 104. The robot controller module 102 is responsible for sending motion commands directly to the robot manipulator 104 and monitoring any cell-related safety concerns. In practice, the robot controller module 102 generally includes a robot controller in conjunction with one or more safety programmable logic controllers (PLCs) for cell monitoring. In a sample embodiment, the robot controller module 102 is setup to take input from the ancillary control unit 1004 that provides defect-specific information and/or commands. This happens, depending on the desired implementation, either off-line via program downloads or parametric execution of pre-determined functions or in real-time via positional/velocity offset streaming. An example of the offline approach would be a pre-processed robot program in the native robot's language (e.g., RAPID, KRL, Karel, Inform, etc.) that gets run by the robot controller module 102. On the other hand, example streaming interfaces would be through robot OEM provided sensor interface packages such as Fanuc's Dynamic Path Modification package or Kuka's Robot Sensor Interface. In this real-time embodiment, the ancillary controller 1004 (described in further detail below) would send on-line, real-time positional offsets to the robot controller module 102 based on the defect being repaired.

In a sample embodiment, the Kuka KR C4 controller with KUKA.RobotSensorInterface option package for on-line real-time streaming of positional corrections may be used as robot controller 102 with the Kuka KR 60 HA robot manipulator 104.

In the embodiment of FIG. 10, the pre-inspection data module 116 and the post-inspection data module 118 provide the body-wide inspection data for each part to be processed. The type of sensor 1002 required here depends on the characteristics of the problem at hand (i.e., primer or clear-coat repair). In particular, the specularity of the surface of the substrate 120 drives the selection of the sensor 1002. For highly specular (reflective) surfaces, reflective approaches are usually selected with one of the leading techniques being calibrated stereo deflectometry. For non-reflective scenarios (i.e., primer repair), projection approaches are preferred. Both approaches are similar in their underlying mathematical principles and differ mainly by their surface illumination approach (i.e., deflection/reflection vs projection). In addition to projection approaches, there is also a benefit to using diffuse reflected or unstructured light with conventional monochrome or RGB imaging for the non-specular or mixed scenarios.

In a sample embodiment for clear-coat repair and sufficient specularity of the body, a Micro-Epsilon reflectCONTROL imaging system is used for both pre-inspection module 116 and post-inspection module 118 enabling continuous on-site learning and policy improvements and process drift compensation.

The ancillary controller 1004 serves as the central communication hub between the specialized paint repair end effector 1005, the robot manipulator 104, and the cloud computing system 1006 and/or local on-site servers or edge computers. The ancillary controller 1004 receives all defect inspection data for the repair at hand (from pre-inspection data and/or any robot-mounted hardware such as end effector sensors 1002) and transmits the resulting policy to the robot controller module 102 and end effector stack 1005 as illustrated in FIG. 10. As noted above, this transmission can be either online or off-line depending on the particular implementation. Ancillary controller 1004 is also responsible for controlling any proprietary end effector hardware 1005 such as the compliant force control unit 108, air/servo tools, water/compound dispensers, sensors 1002, and the like.

In a sample embodiment, the ancillary controller 1004 comprises an embedded (industrially hardened) process PC running a real-time/low-latency Linux kernel. Communication to the robot controller module 102 (via the KUKA.RobotSensorInterface) is accomplished through UDP protocol. Communication to the various end effector components 1005 may be a mix of UDP, TCP, (serial over) USB, digital inputs/outputs, etc.

The stack (end effector tooling) 1005 may include any process-specific tooling required for the objective in sample embodiments. With respect to embodiments including material removal (sanding, primer repair, clear-coat repair, polishing, etc.), some form of pressure/force control and or compliance is required. In general, the robot manipulator 104 itself is too stiff to adequately apply the correct processing forces for clear-coat repair and thus some form of active compliance is often necessary or desirable. Besides the tooling 1003 and abrasive system 112, the sensors 1002 are also desirable as in-situ inspection allows for local hi-fidelity measurements at process-time along with the ability to acquire feedback mid-process, which is not achievable with approaches using only pre-inspection and post-inspection. For example, mid-process feedback is helpful to a successful learning algorithm.

For the application of robotic paint repair (and more broadly robotic sanding), desirable sensors for use as sensors 302 include (but are not limited to) the following:

1. Proprioceptive sensors that detect vibration using accelerometers or microphones and dynamics using RPM tools, joint efforts (i.e., force, torque, accelerations, and/or velocities), linear (end effector) effort (i.e., force and/or torque) including accelerations and/or velocities, and force/pressure tools.

2. Exteroceptive sensors including imaging sensors, temperature sensors, and/or humidity sensors. The imaging sensors may be visual sensors including RGB, monochrome, infrared, haze, reflectivity, and/or diffusivity sensors, or may be topographical sensors including RGB-D (structured light, time-of-flight, and/or stereo photogrammetry), stereo deflectometry, profilometry, and/or microscopy. The exteroceptive sensors may also include tactile sensors for elastomeric imaging (i.e., GelSight).

3. Temperature sensors may also be used including thermocouples and/or IR thermal imaging.

4. Humidity sensors may also be used.

In a sample implementation for sanding, primer repair, clear-coat repair, and polishing applications, the abrasive/compound 112 may comprise a 3M Trizact Finesse-it abrasive system used with a 3M air-powered random orbital sander as tool 1003. In such a sample implementation, the compliance force control unit 108 may comprise a FerRobotics ACF, and the sensors 1002 may comprise a Pico projector, a 5-inch 4K LCD micro display, an Ethernet camera, and/or a GelSight unit. Further examples of sensors 1002 are provided below.

The manual clear-coat repair process, at a high-level, is well known and accepted in the industry. It is a two-step process: abrasion/sanding and polishing/buffing From an automation perspective, the following inputs and outputs may be of relevance in different embodiments (with examples from the 3M Finesse-it™ system):
Inputs:
  Shared (sanding and polishing)
    Tool speed [frequency]
    Tool orbit [length]
    Randomness (i.e., random orbital vs. orbital)
    Path pattern
    Path speed [velocity]
    Applied force
    Angle (i.e., off normal)
    Total process time
  Sanding-specific
    Backup pad
      Hardness
      Abrasive Disc
        Product
          e.g., {468LA, 366LA, 464LA, 466LA}
        Grade
          e.g., {A3, A5, A7}
        Diameter/Scallop
          e.g., {1¼", 1⅜" scalloped}
        State
          Age (e.g., age≈(pressure, time))

Cleanliness (e.g., has the disc been cleaned?)
Polishing-specific
  Buffing pad
    Foam
      e.g., {Gray, Orange, Red, Green, White}
    Diameter
      e.g., {3¼", 3¾", 5¼"}
    Surface profile
      e.g., {flat, egg crate}
  Polish
    Amount
    Distribution
    Finish
      e.g., {FM, P, EF, K211, FF, UF}
Outputs:
  Uniformity
  Roughness
  Gloss percentage
  Time to buff
  Final buff quality (e.g., uniformity, haze, etc.)

Figure 11:
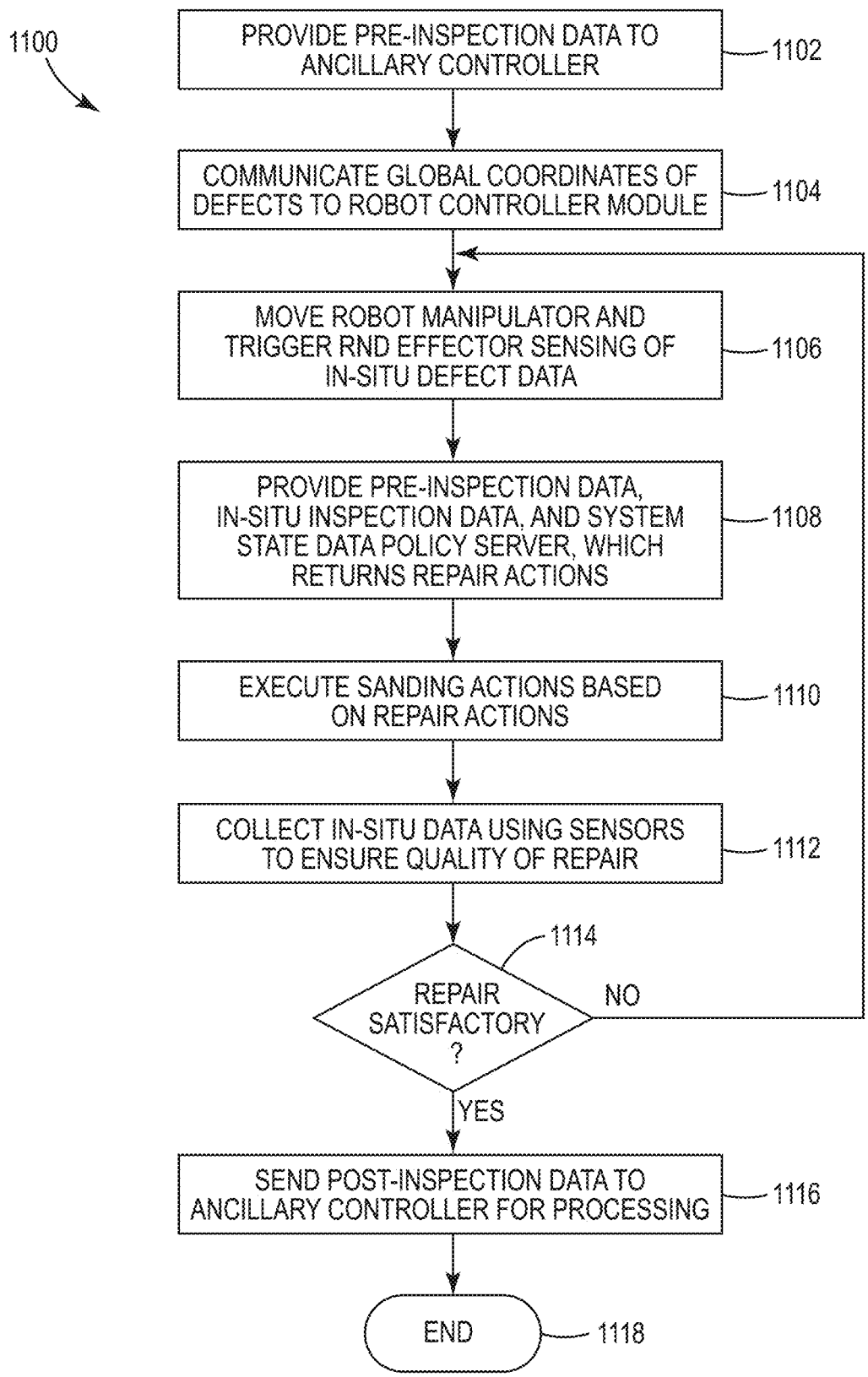
FIG. 11 illustrates a sample process flow of a sample embodiment for robotic paint repair in a sample embodiment.

In a sample repair scenario, the process flow including such inputs and outputs may be implemented as illustrated in FIG. 11. As illustrated in FIG. 11, the process flow 1100 includes providing pre-inspection data to the ancillary controller 1004 from the from pre-inspection data module 116 at 1102. The pre-inspection data contains global, body-centric coordinates of each identified defect along with (optional) geometric data/profiles and/or classification of the defect itself. Global coordinates of the identified defects are communicated to the robot controller module 102 at 1104 along with any external axes such as conveyor belt position such that the robot manipulator 104 can bring the end effector into close proximity to the identified defects in succession. If the optional local defect information and/or classification was provided, this can be used to select defects to process or skip. Then, the ancillary controller module 1004 in conjunction with the robot controller module 102 move the robot manipulator 104 and trigger end effector sensing by sensors 1002 at 1106 to take in-situ local defect inspection data using local uncalibrated deflectometry information.

At 1108, the pre-inspection data, in-situ inspection data, and current state of the system (e.g., loaded abrasive/compound, abrasive life, current tooling, etc.) is transferred to the policy server 1009 in the cloud computing system 1006, which takes all of the inspection data and current system state and returns repair actions using a previously learned control policy. Returned sanding actions (step one of two-part repair) from the learned policy are then executed at 1110 by the ancillary controller 1004 through simultaneous communication with the robot controller module 102 and end effector stack 1005. Actions in this example include set points for tool RPM, pressure (control input into compliant force flange), robot trajectory, and total processing time. In a sample embodiment, the robot trajectory is communicated as time-varying positional offsets from the defects origin using the KUKA.RobotSensorInterface package interface. In-situ data is collected using sensors 1002 to ensure quality of repair. The in-situ data is saved for later learning updates using fringe pattern projection or traditional imaging using monochrome/RGB cameras and diffuse reflected or unstructured white light to capture diffuse reflections from the newly abraded areas.

Any in-situ imaging data can, in addition to driving the selected repair policy, be used to localize/servo off of the defect when guiding the robot and thus eliminate any error in the manufacturing system. In general, the global pre-inspection data, if collected, is taken significantly upstream in the manufacturing process and positioning error can easily be on the order of inches by the time the part reaches the paint repair station.

If it is determined at 1114 that the repairs are not satisfactory, steps 1106-1112 may be repeated until the repair is deemed satisfactory, but such iterations are not needed in the case of an optimal repair policy execution.

Steps 1106-1114 also may be repeated for buffing commands (step two of two-part repair) returned from the policy server 1009 in the cloud computing system 1006.

Finally, post-inspection data is collected by the post-inspection data module 118 on final quality of repair at 1116 and the post-inspection data is sent to the ancillary controller 1004 for processing. All data (pre-inspection, in-situ, and post-inspection) is sent to the policy server 1009 in the cloud computing system 1006 for logging and for learning updates. The process then ends at 1118.

The policy server 1009 has been described herein as located in the cloud computing system 1006. However, it will be appreciated that the policy server 1009 may be located local to the remainder of the robotic paint repair stack 1000 on the manufacturing floor depending on the desired implementation and/or security needs. In operation, the policy server 1009 maintains the current learned policy (or policies) and provides control outputs based on state and observation queries. The policies are obtained through an appropriate learning algorithm (described below). The particular nature of the outputs of the policy server 1009 depends on the communication mode used by the ancillary controller 1004 (i.e., online or off-line). In an off-line approach, the outputs of the policy server 1009 correspond to process parameters such as dwell time, pressure, speed, etc. On the other hand, an online approach is capable of outputting a policy that directly controls the efforts at the robot's joints (actuators). In this scenario, latency is an issue and usually requires a local (non-cloud-based) policy server 1009.

In a sample cloud-based configuration of the policy server 1009, the policy server 1009 receives pre-inspection data, and system state as input and outputs process time, process pressure, process speed (RPM), orbit pattern (tooling trajectory), and the like. The policy server 1009 optionally may also receive in-situ inspection data.

The machine learning unit 1008 is a module that runs in tandem with the policy server 1009 and runs learning updates to improve the policy when requested. The machine learning procedure includes learning good policies for defect repair where a policy is simply a mapping between situations (defect observations) and behavior (robot actions/repair strategy). Ideally, the machine learning system 1008 provides super-human performance and thus cannot assume that a significantly large labeled dataset of defect and repair strategies exists. Because the existing knowledge may be incomplete, the system does not use supervised learning techniques as a total solution. However, the system does have the ability to identify a repair as good or bad (or anywhere in between) using sensor feedback collected during processing and further has the ability to use reinforcement learning to address the lack of a large labeled dataset of defect and repair strategies.

Reinforcement learning is a class of problems and solutions that aim to improve performance through experience. In general, a reinforcement learning system has four main elements: a policy, a reward function, a value function, and an optional model of the system. The policy is mainly what one is interested in finding as it maps perceived states of the system to actions. In the sample scenario described herein, this is a mapping between defect images and robot repair actions. The images can be pre-processed and/or have features extracted but these are not requirements. The reward function defines the goal of the problem as a mapping between states (or state-action pairs) and a single numerical reward that captures the desirability of the situation. The goal of the system is to identify a policy that maximizes the reward. The value function is a prediction of future rewards achievable from a current state which is used to formulate policies. The optional model is an approximation of the environment that can be used for planning purposes.

In general, most reinforcement learning tasks, including those used in sample embodiments, satisfy the Markov property and constitute a Markov decision process (MDP). At a high-level, the defect repair problem of a sanding and polishing process using machine learning can be represented as a finite MDP by the MDP transition graph 1200 illustrated in FIG. 12. In the MDP transition graph 1200 of FIG. 12, the task is represented using four states with S={Initial (1202), Sanded (1204), Polished (1206), Completed (1208)}. The Initial state 1202 is the defect in its original, unaltered state. The Sanded state 1204 and the Polished state 1206 occur after sanding and polishing actions, respectively, and the Completed state 1208 marks the end of the repair (as well as the end of the learning episode). On the other hand, the actions are represented by the set A={complete (1210), tendDisc( ) (1212), sand( ) (1214), polish( ) (1216)}. As illustrated, the complete action 1210 takes the system immediately to the (terminal) Completed state 1208. A Complete action 1210 from the Initial state 1202 is analogous to a "do not repair" scenario and gives the system the ability to opt out of repairs for cases where the defect is irreparable and/or a repair would leave the system in a worse state than its original state. The tendDisc( ) 1212 action signals the robot manipulator 104 to either get a new abrasive disc 112 for the end effector stack 1005, apply water to the current disc 112, or perform a cleaning operation of the current disc 112 to remove loaded material. In general, the abrasive life is greater than a single repair. However, the performance of the abrasive disc 112 over time is not constant. Having this action allows the system to (optimally) decide when a new abrasive disc 112 is necessary or desirable. Additionally, an optimal policy will consider the disc's learned abrasive life compensation and select repair actions accordingly (e.g., as the pad wears/loads more force might be required, etc.) The final two actions, sand( ) 1214 and polish( ) 1216, are the processing functions and are in general parametric. The parameters include processing information such as tool RPM, applied pressure, dwell/process time, repair trajectory, etc. A number of different parameterizations are possible depending upon the nature of the identified defect and the repair action to be taken.

Although the problem has been expressed as a finite MDP, it will be appreciated that each state and action live within continuous domains. For example, the Sanded state 1204 from a high-level represents the defect after sanding has occurred but the state itself includes imaging data of the defect after sanding that is inherently high-dimensional and continuous. Additionally, the sand and polish actions 1214 and 1216, respectively, are parametric functions where the parameters themselves are continuous.

Figure 13:
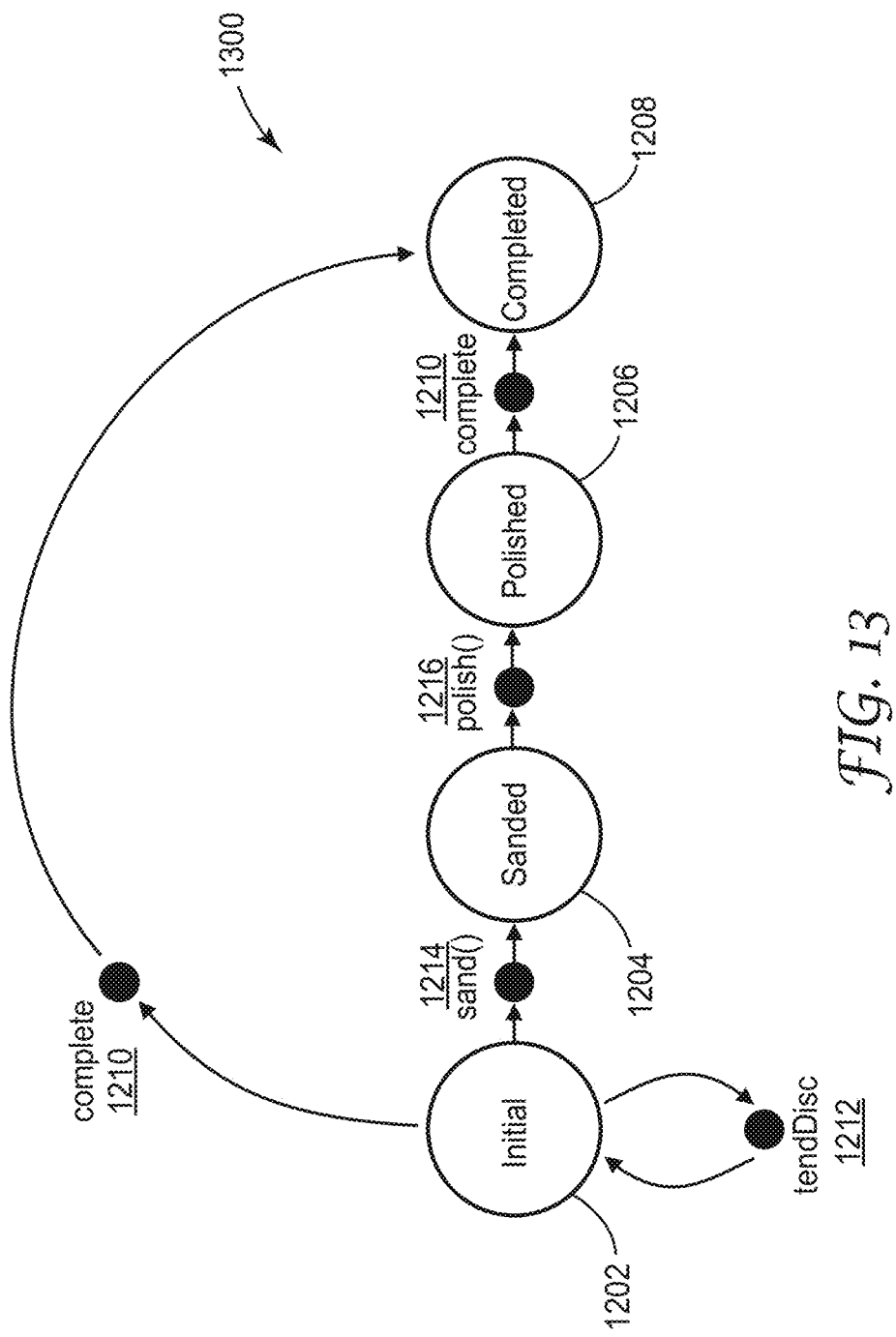
FIG. 13 illustrates a simplified MDP transition graph of a sanding and polishing process suitable for reinforcement learning in a further sample embodiment.

An alternate simplified MDP transition graph 1300 as shown in FIG. 13 is possible where a perfect repair consists of a single sanding action 1214 followed by a single polishing action 1216. The MDP transition graph 1300 reduces the number of actions at any given state and thus the dimensionality of the problem at hand. While the MDP transition graph 1300 constitutes a simplification, the problem can be expressed much more generally in a fully continuous manner where the state is expanded to include the robot's joint positions/velocities and the actions expanded to consist of position, velocity, or effort commands. In this scenario, the robot manipulator 104 is given no empirical domain knowledge of the repair process in the form of finite state transitions and instead has to learn real-time control actions that achieve the desired process. However, this problem formulation requires significantly more experience to converge to useful policies and is arguably unnecessarily general for the industrial task at hand.

In use, the system continues to take images and to provide sensor feedback in-process that is used to adjust system parameters on the fly.

A sample embodiment of the machine learning system may also be implemented on the illustrated automated robotic clear-coat defect repair system. Two possible algorithm implementations are described: one for each of the MDP transition graphs illustrated in FIG. 12 and FIG. 13. For both examples, the same hardware setup is used, including a robot manipulator 104 and robot controller 102 implemented using a Kuka KR10 R900 sixx with a KR C4 compact controller; tooling 1003 including a robot-mounted custom random orbital sander (ROS) in conjunction with a FerRobotics ACF/111/01 XSHD active contact flange; an abrasive/polishing disc including a 3M Finesse-it™ system (e.g., 3M Trizact abrasive discs with 3M polish and corresponding backup pads/accessories); and sensors 1002 comprising 5" 4K LED display, 1080P Pico projector, and a 5 MP color CCD camera for imaging in both the specular (deflectometry) and diffuse (fringe projection) modalities.

Figure 12:
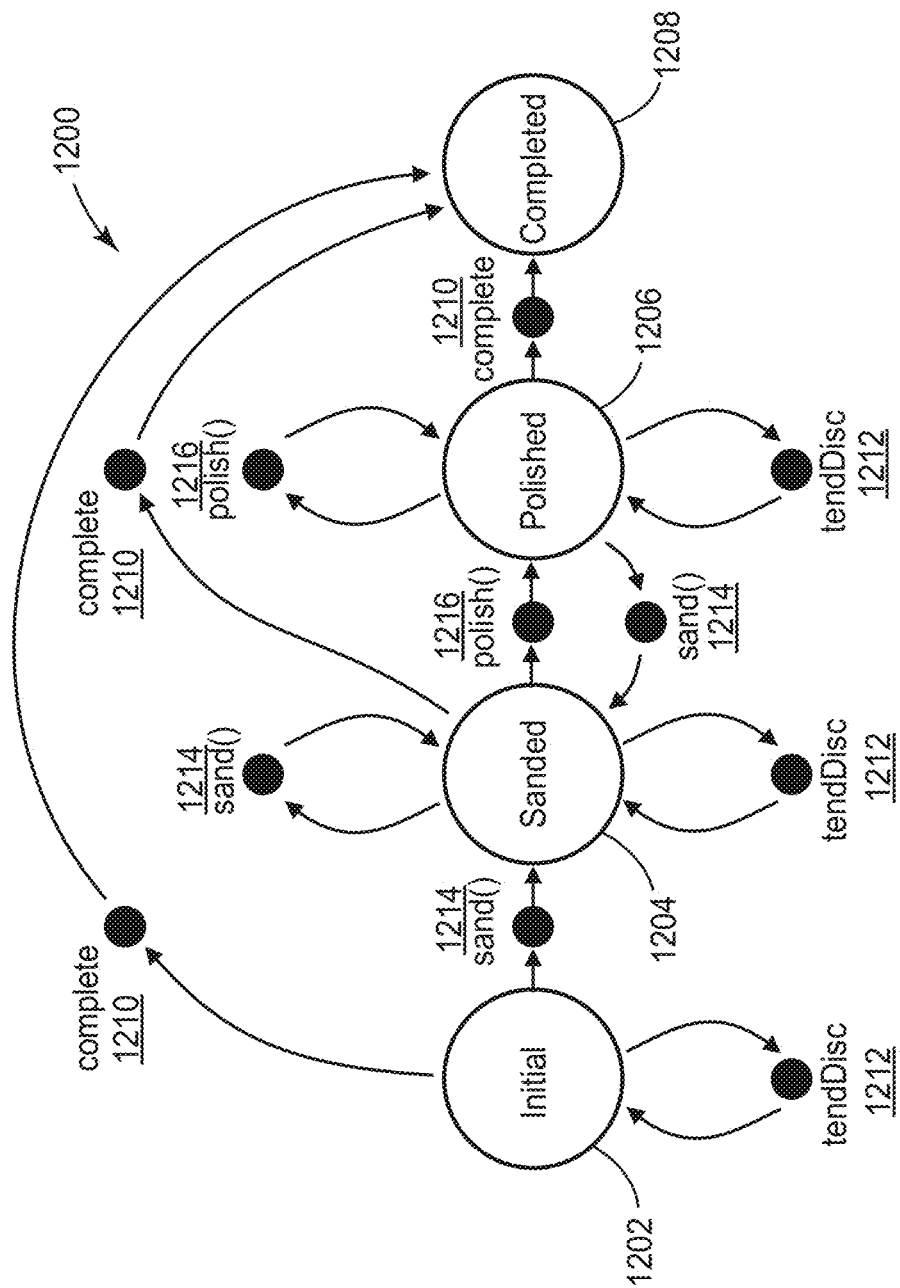
FIG. 12 illustrates a Markov Decision Process (MDP) transition graph of a sanding and polishing process suitable for reinforcement learning in a sample embodiment.

Using the above setup, the system and method described above was applied using the larger n-step MDP transition graph of FIG. 12. In this case, Deep Deterministic Policy Gradients (DDPG) were used along with Hierarchical Experience Replay (HER) and sparse rewards (via pre-trained classifier).

The system and method described above was also applied using the simplified smaller 2-step MDP transition of FIG. 13 assuming the processing steps of sanding and polishing with imaging immediately before each step. In this case, Deep Deterministic Policy Gradients (DDPG) were again used but instead image-based shaped rewards (similar to work of Perceptual Reward Functions) were used based on similarity measures of the repaired area compared to the "good" surrounding area.

This approach is based on the observation that a perfect repair is indistinguishable from the surrounding un-repaired good area.

The system and method described above was also applied using the simplified smaller 2-step MDP transition of FIG. 13 assuming the processing steps of sanding and polishing with imaging immediately before each step. In this case, the continuous parametric actions were used with discretized parameters as inputs, thus enabling the use if Deep Q-Learning (DQN). This case can use either sparse or shaped rewards.

Data Collection

An important issue in any reinforcement learning problem is generating enough experience for the learning algorithm to converge to the desired optimal policy. In industrial processing applications, generating sufficient experience is a significant issue and is often prohibitively expensive and/or time consuming. One common approach across all of reinforcement learning is to leverage sufficiently good computer (digital) simulations for experience generation. For industrial tasks, however, and processing in general, the task of building an accurate computer simulation can be as difficult or even harder than the problem of finding an optimal policy. That said, it is often important to find efficient and clever ways to produce low-cost, data-rich real-world experience. In this respect, physical simulations are generated that sufficiently mirror the actual manufacturing process of interest.

With respect to the domain at hand, robotic paint repair, the problem is even more difficult due to the fact that the process is inherently "destructive" in nature and thus irreversible (i.e., any processing applied to a paint defect will alter the state of the defect). Embodiments are outlined below for both a data collection procedure and defective part creation.

Defect Simulation

Some form of simulation (digital or physical) is often desirable in order to generate sufficient amounts of experience for applied learning algorithms. Several possible methods are outlined below in the context of paint repair.

It is first noted that a significant majority of paint repairs occur on body regions that exhibit 2D-manifold structure (i.e., they are locally flat in the context of a single repair). High curvature areas of an autobody (e.g., around trim, door handles, etc.) are the exception but, in general, learned policies from flat surfaces can be applied to curved surfaces with some robot trajectory modification. With this in mind, a convenient (from both a cost and handling perspective) standardization is to use flat painted substrates for a majority of the data collection and experience generation.

Flat rectangular painted test panels are commercially available on a number of different substrates with a number of different thicknesses, sizes, paints, clear coats, under coats, etc. available. Panels can either be purchased from such a commercial source or prepared using the same or similar methods and equipment as the process to be learned.

Ideally, no paint defects would ever be introduced on the manufacturing parts and thus the manufacturing process is designed to produce the best parts possible. Realistically, defects do exist; however, from a reinforcement learning perspective the defect density on any production part or simulated test/learning substrate is relatively low. Every manufacturing process is different in terms of quality, but it is not uncommon to have on the order of less than one defect per thousand square inches of paint. Thus, it can become very expensive to find sufficient amounts of defects to generate experience for the learning algorithm.

To solve this problem, methods of generating sufficiently dense defective substrates have been developed. For any convenient standard sized flat substrate, defective paint and/or clear coat with defect density on the order of greater than one per square inch are generated. The exact density is adjustable, but the particular density results in a high probability that any arbitrary grid discretization of a learning substrate will contain at least one defect.

Figure 14:
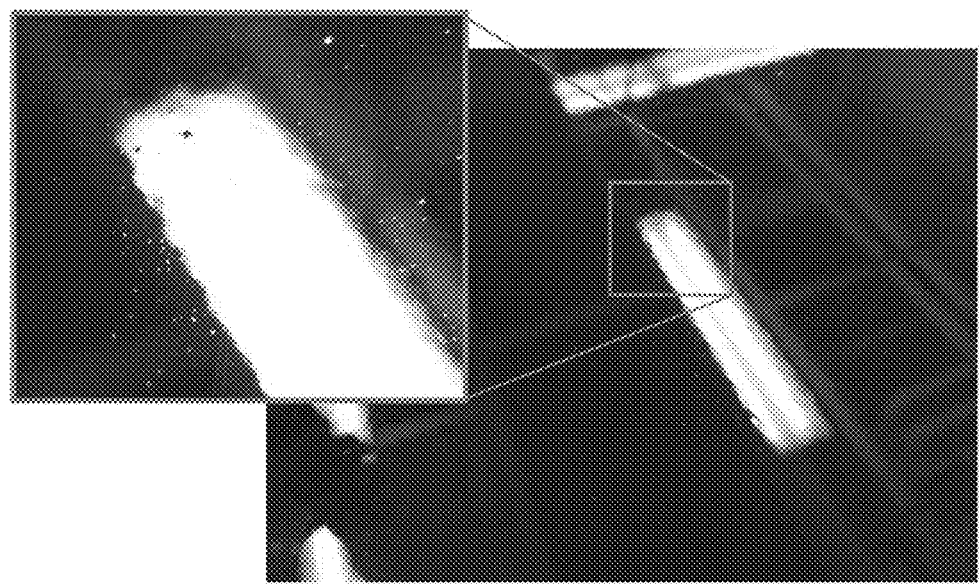
FIG. 14 illustrates a high-density defect learning substrate where the defect caused by introducing synthetic dirt of a particular size under the clear coat is most visible at the boundaries of the ceiling light reflection.

It is possible to mimic a majority of naturally occurring defects of interest such as nibs (contaminates), craters, fish-eyes, drips, sags, etc. by utilizing combinations of (synthetic) contaminates, silicone, paint/clear coat spray rates/patterns, solvent, etc. FIG. 14 shows the result of introducing synthetic dirt of a particular size under the clear coat. FIG. 14 illustrates a high-density defect learning substrate where the defects are most visible at the boundaries of the ceiling light reflection. To make this learning substrate, one starts with a commercially available painted and clear-coated test panel. The panel was sanded in its entirety (using 3M Trizact 6-inch disc on a random orbital tool) and then treated with the synthetic dirt before re-applying the clear coat and final curing.

An additional method involves using sufficiently thin panels and punching the back-side in a controlled manner (e.g., with a spring-loaded punch) to create a raised defect on the top. While convenient, such defects do not always mimic the exact repair behavior as those occurring naturally and in OEM settings.

Data Collection Procedure

The following is an example procedure for collecting defect repair data. The system performs defect repairs on the substrate at a number of discrete pre-determined locations regardless of type, number, and/or presence of defects (see below for example discretization and discussion). Learning/optimization algorithm differences aside, the basic processing structure of a single substrate is as follows:

```
For provided substrate q
    Image q
    For each cell i,j of q
        Take action tendDisc( )
        Take action sand( )
    End For
    Image q
    For each cell i,j of q
        Take action polish( )
        Take action completed
    End For
    Image q
End For
```

The specified states Sanded and Completed are taken from the MDPs of FIG. 12 and FIG. 13 and any parameters taken by actions are provided by the specified learning/optimization algorithm.

As outlined, the substrate 120 is first imaged and then subsequently presented to the robot for sanding The substrate 120 is secured via a hold-down mechanism (e.g., magnets, vacuum, clamps, etc.). On a per-cell basis of the predefined grid, the algorithm first performs disc tending via the tendDisc( ) action. This results in some combination of cleaning, wetting, and/or changing of the abrasive disc. The sand( ) action is then taken based on the imaging data (defect characteristics) current provided policy via the policy server 1009.

After each grid location is sanded, the panel is then imaged again before polishing. Again, on a per-cell basis, the robot polishes each of the substrate's pre-determined grid locations with specified polish applied to each grid cell. After polishing the panel is again imaged.

After an entire panel is processed as above, defect characteristics via imaging data are available for each of the grid cells before, during, and after the repair process. Additionally, the executed policies are stored for each cell in conjunction with the characteristic imaging data. Reinforcement learning updates are run for each of the cells after a prescribed number of substrates have been processed.

The above can be implemented on a spectrum of automation based on speed and cost requirements. A simple implementation might use separate robots for each of the sanding and polishing actions and a bench-top imaging setup where a human operator is responsible for moving substrates between the cells as well as changing discs when requested. A fully automated setup might include tool changing for the end effector and thus can be implemented with a single robot. Additionally, conveyors can be used for substrate handling or the imaging can happen within the robot cell via cell-mounted cameras or imaging end effectors.

With the above approach with high-density defect painted substrates and automated grid-based policy execution, it is desirable to make the grid discretization as tight as possible to maximize the used portion of each substrate. Provisions are made such that no repair interferes with its neighboring cells during the substrate processing procedure. One approach is to select the tightest cell discretization such that any particular repair action exists entirely within a single cell. This naïve approach, while feasible, can result in poor utilization of the substrate.

Using the 3M Finesse-it™ system as an example, a sample discretization for efficient substrate processing is outlined. In this system, the sanding discs are significantly smaller than the buffing pads (e.g., 1¼ inch diameter sanding pads vs 3½ inch diameter buffing pads). Additionally, the throws on the random orbital tools are ¼ inch and ½ inch respectively. Assuming circular trajectories with at least half-diameter overlap, the minimum repaired affected areas for the sanding and polishing are circles of diameters 2¼ inches and 6 inches, respectively. Here it can be seen that the required buffing area is much larger and thus contributes significantly to substrate waste by greatly limiting the repair cell nesting density.

To overcome this limitation, it is possible to devise a modified panel process procedure where polishing is shared amongst neighboring cells. An adjacent batch of cells can be sanded independently and then polished together using a polishing trajectory created from concatenation of the individual cells' polishing trajectories.

As an example, the 3M-Finesse-it™ system's suggested "L" shaped polishing trajectory is used where the defect is at the bottom-left vertex of the "L" and the polishing pad is moved in alternating up-down and left-right motions. With this pattern, it is possible, through rotation and translation, to put four "L"s together to make a square. Thus, four cells can be sanded independently that together make a square and then polished using a square polishing trajectory. This method greatly improves achievable cell density and allows for up to 24 repair cells on a 12 by 18-inch substrate.

Figure 15:
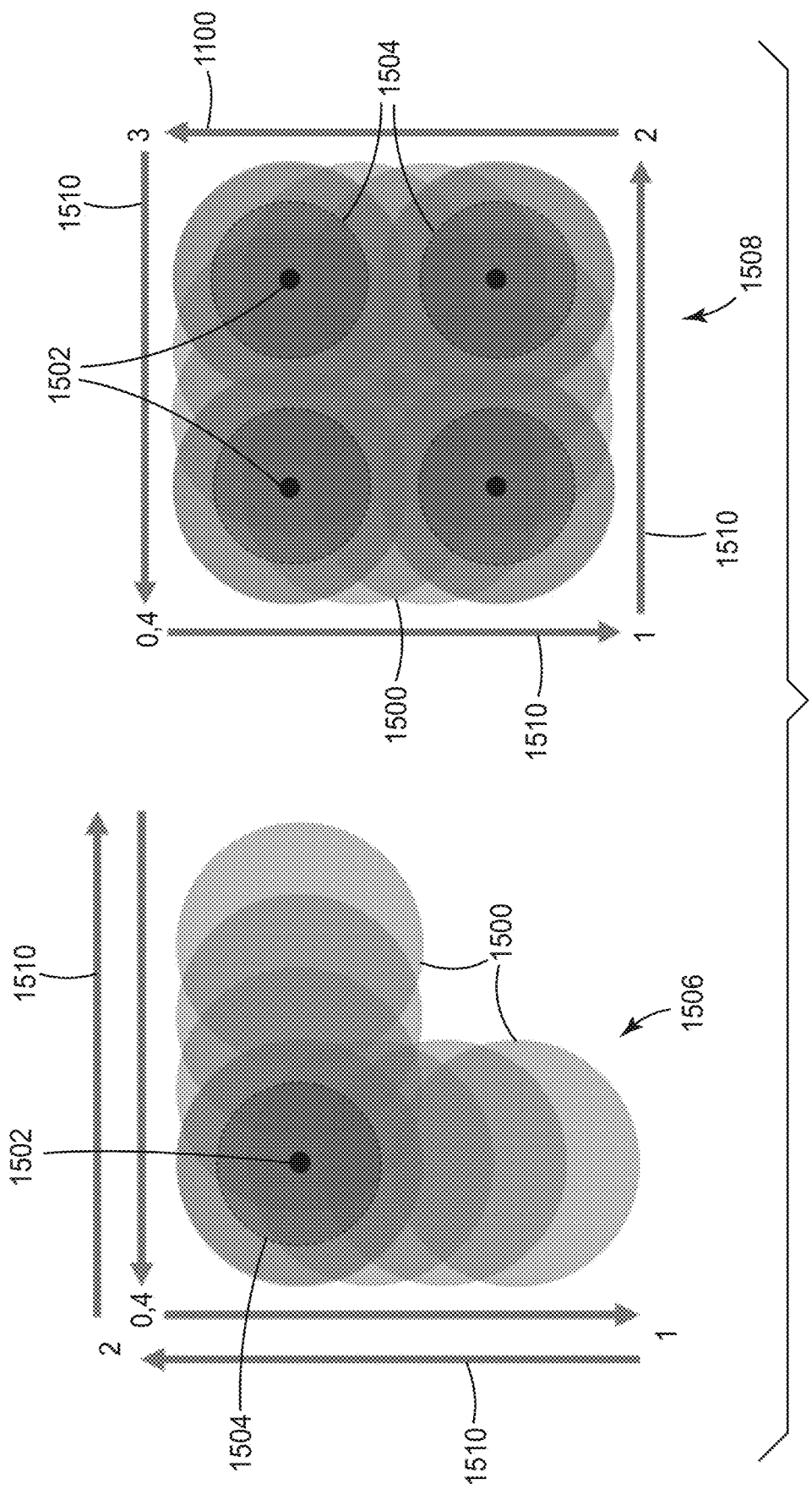
FIG. 15 illustrates sample polishing patterns.

FIG. 15 illustrates sample polishing patterns depicted by transparent circles 1500. Defect locations are depicted as dots 1502. Circles with dashed outlines represent the repair area 1504. The "L" pattern 1506 (left) and square pattern 1508 (right) are represented by arrows 1510 with numbers for each time the polisher stops.

Figure 16:
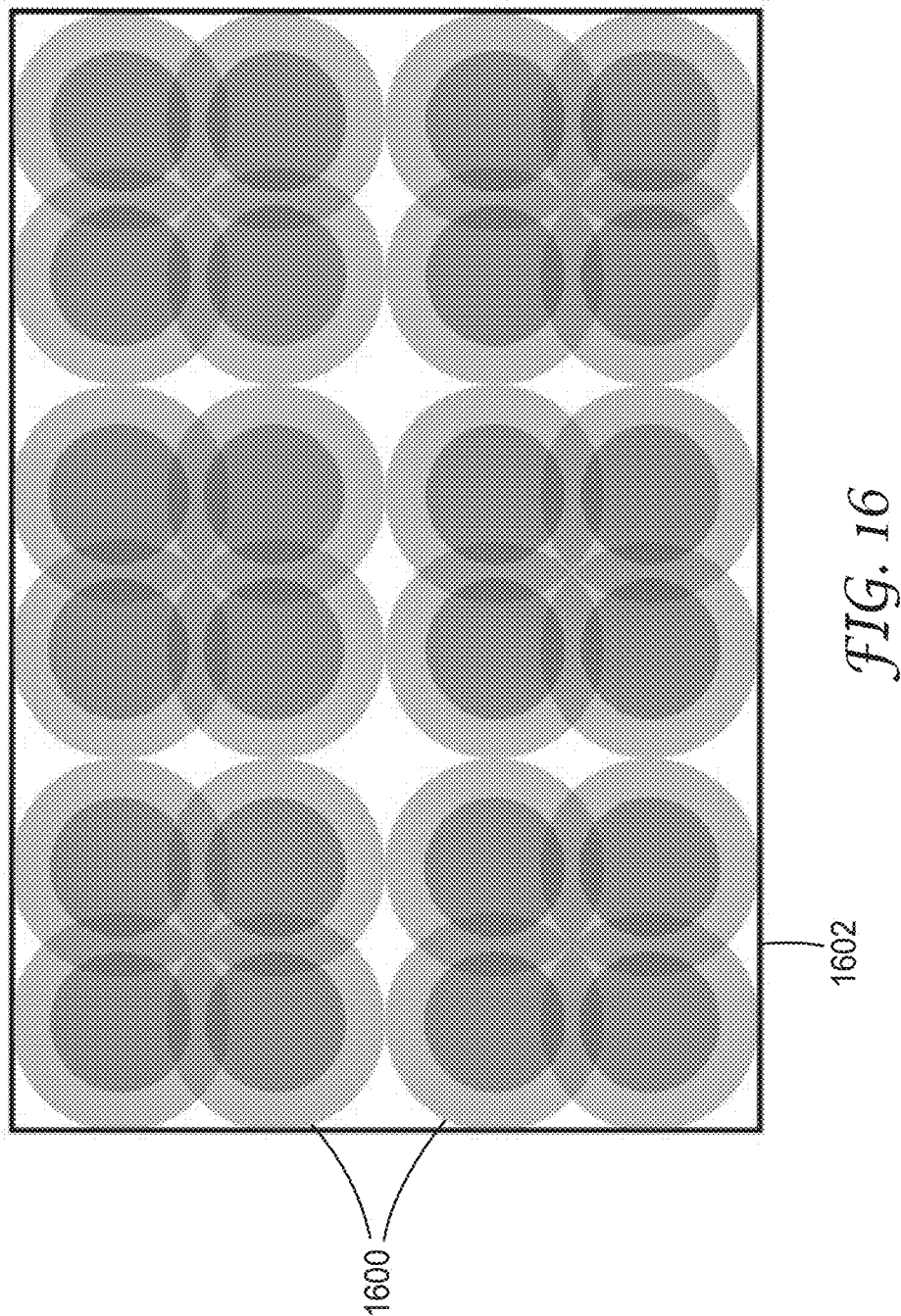
FIG. 16 illustrates an example of high-efficiency nesting of the polishing patterns.

FIG. 16 illustrates an example of high-efficiency nesting of the polishing patterns 1600 with the aforementioned Finesse-it™ accessory dimensions on an 18-by-24 inch panel substrate 1602. Each set of four sanding repairs shares a single square polishing path in FIG. 15 (right).

Defect Characteristics

In general defect characteristics can be taken as any combination of the following:

Engineered features (size, type, etc.)
Raw image data (matrix/tensor of intensity values)
Pre, mid (in-situ), or post-repair collected Current approaches use engineered features that are, in general, human-centric. That is, they exist based on historical expertise of the currently manual process. Such features include "meaningful" measures such as type of defect, size of defect, severity of defect, etc. In practice, each manufacturer has their own set of features and respective classifications that have evolved over time in the form of an operation procedure for the paint repair process. Additionally, many of the newer automated inspection offerings come with their own classifications and features.

Figure 17:
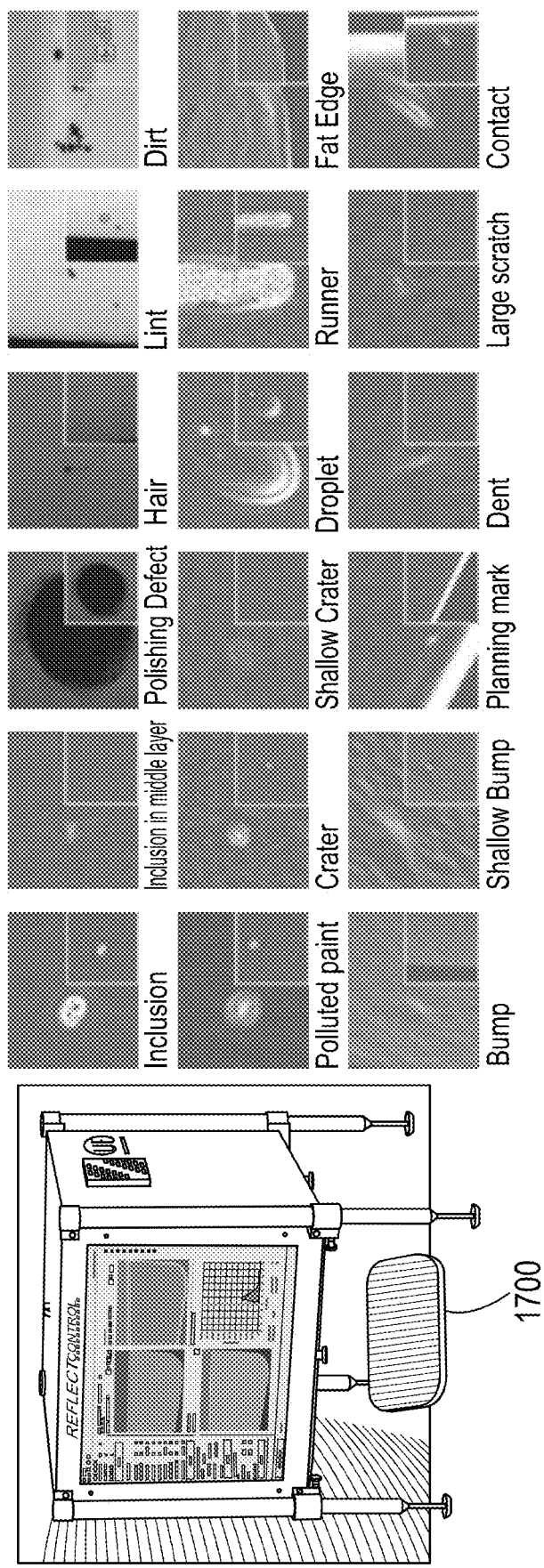
FIG. 17 illustrates Micro-Epsilon reflect CONTROL paint defect images provided by the manufacturer.

For example, FIG. 17 illustrates a series of paint defect images 1700 provided by a Micro-Epsilon reflect CONTROL device 1702. These classifications are traditionally engineered empirically based on human processing experience/expertise, but other approaches have used newer machine learning techniques such as supervised and unsupervised learning with success.

While seemingly attractive, a robotic process does not necessarily benefit from such human-centric features, classifications, and/or descriptors. By using reinforcement learning techniques along with deep neural networks, the system is given the freedom to learn its own representations internally via convolution kernels that best capture the defect characteristics in the context of the process domain (i.e., robotic paint repair).

The inventors have found benefits to using unprocessed, uncalibrated, and/or raw imaging data in place of the aforementioned traditional engineered feature descriptors. Uncalibrated deflectometry data from image processing module 314 is used in a sample embodiment. This approach greatly relaxes the complexity of the system, as calibration, alignment, and processing are arguably the most difficult parts of implementing such vision processing. Additionally, the use of uncalibrated and/or raw imaging greatly reduces maintenance burdens and allows for smaller (robot mounted) systems that can take in-situ processing imaging and data. This can greatly improve both the teaming rate of the system as well as improving the overall capability, performance, feedback, analytic options, etc.

Figure 18:
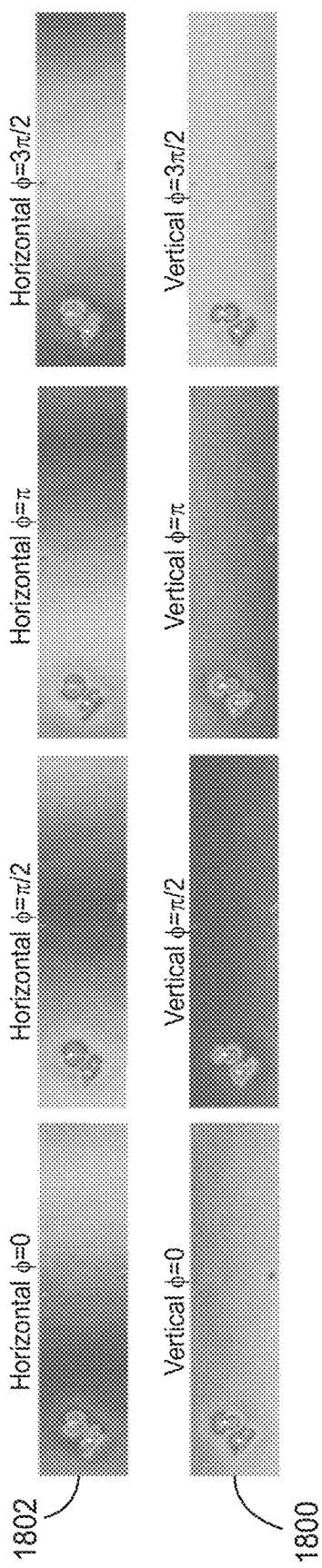
FIG. 18 shows eight images, four of a deflected vertical fringe pattern and four of a deflected horizontal fringe pattern each shifted by multiples of π/2.
Figure 19:
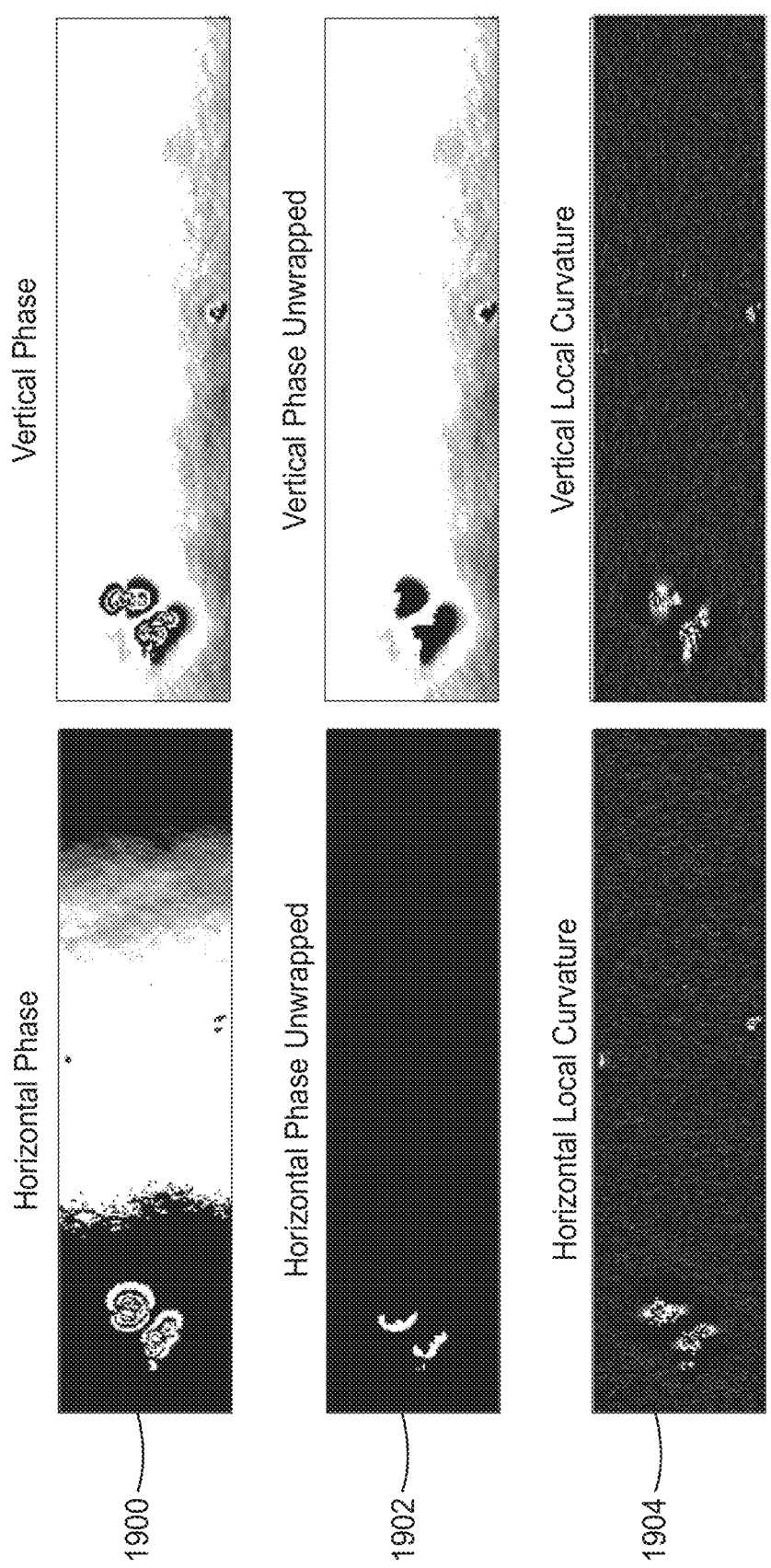
FIG. 19 shows the horizontal and vertical curvature maps computed using the arc tangent of pixels across the four deflected fringe patterns with subsequent phase unwrapping.
Figure 20:
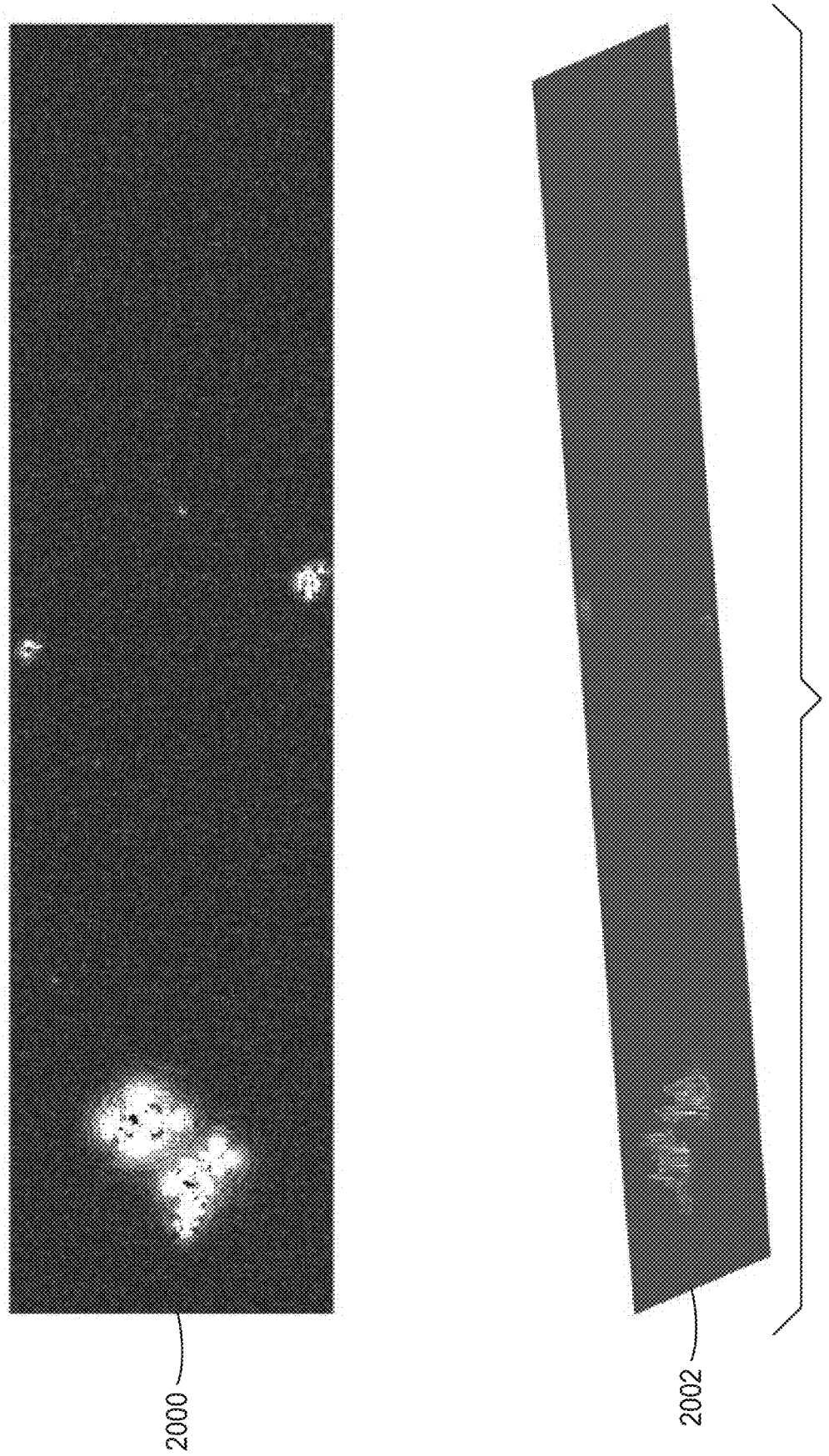
FIG. 20 is the composite (square root of the sum of squares) local curvature map combining both the horizontal and vertical results visualized as both an intensity map and mesh grid.

FIG. 18-FIG. 20 show how uncalibrated deflectometry images can be used to compute local curvature maps of the defects. FIG. 18 shows eight images, four of a deflected vertical fringe pattern 1800 and four of a deflected horizontal fringe pattern 1802 each taken where the pattern source was shifted by multiples of $\pi/2$. FIG. 19 shows the horizontal and vertical curvature maps computed using the arc tangent of pixels across the four deflected fringe patterns. The top curvature map 1900 are the results of the arc tangent (modulo $2\pi$) the middle curvature map 1902 the unwrapped phase shifts, and the bottom curvature map 1904 the local curvature approximated using first-order finite pixel-wise differences. FIG. 20 is the composite (square root of the sum of squares) local curvature map combining both the horizontal and vertical results visualized as both an intensity map 2000 and mesh grid 2002.

The more common act of computing a height map of a surface using deflectometry requires integration of the measured phase shifts and thus is very sensitive to calibration and noise. Local curvature uses instead derivative and is thus less sensitive. Additionally, if one focuses only on a significantly small area (i.e., a single defect repair) assumptions can be made that low-curvature features are not relevant (i.e., 2D-manifold) and thus can utilize relative curvature as an indicator of defect size and intensity.

In the above example, the local curvature was manually extracted but only to show that such information exists within the raw imaging data and is useful. In practice, the reinforcement learning algorithm will discover similar (perhaps more relevant) features and mappings.

Another interesting use of the above example is in the construction of reward functions and defect classification. Local curvature maps provide a simple thresholding approach where a region is marked defective if the maximum local curvature exceeds some threshold.

Figure 21:
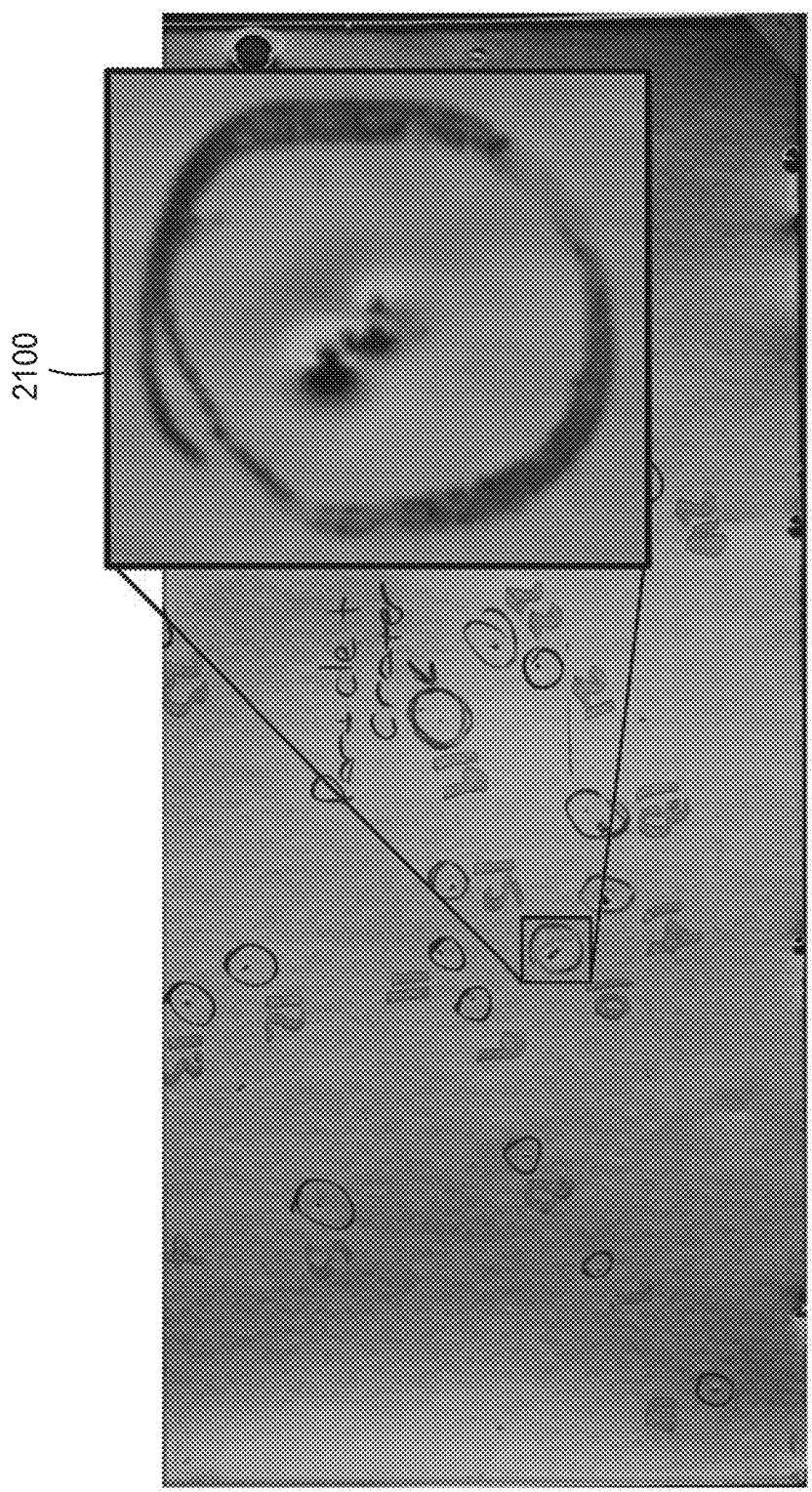
FIG. 21 shows a sample near dark field reflected image.

Utility may also be found in simpler approaches using near dark field reflected light and conventional imaging with unstructured white light and RGB/monochrome cameras. The former works on both specular (pre/post-processed) and matte/diffuse in-situ (mid-process) and the latter in-situ. FIG. 21 shows a sample near dark field reflected image 2100. In this method, the pixel intensity can be interpreted (with some assumptions regarding surface uniformity) as an approximation of the surface gradient (i.e., slope). Thus, such images have the capability to provide surface/defect information without the computational burden of phase unwrapping as with deflectometry methods.

In the same way that reinforcement learning is capable of inferring its own feature representation, it is also capable of learning the effect of use on future performance of the abrasive. In other words, abrasives perform differently throughout their life. By encoding the usage of the disc in the MDP state augmentations, the policy can choose actions based on the predicted state of the abrasive. Some possible encodings include simply the number of repairs, or more complicated functions of force, time, etc. Another approach is to incorporate, via in-situ data collection from the end effector, performance-indicative measurement such as vibration/heat/etc. or even place sensors within the abrasive article (or polishing pad) itself. In this approach, the reinforcement learning algorithm is allowed to identify and leverage mappings between in-process observations and predicted performance directly.

Stage V

Referring back to FIG. 3, the final stage (Stage V) is the execution of the selected actions by the application control module 350. Depending on the particular instantiation, the application control module 350 synchronizes the actions and feedback of the end effector tooling, robot, and other significant tooling At the highest level, the application control module 350 is simply in charge of executing the actions provided by the discrete action selector module 330 and the processor selector modules 340, 342, and 344. Depending on the exact nature of the action specification, however, the implementation of the application control module 350 can differ. The two major governing characteristics are breadth of control and input form.

Control breadth is determined by the number of devices under control of the application control module 350. In simple cases, the application control module 350 can send commands to a master device such as an industrial PLC. For more advanced implementations, the application control module 350 can directly control any application-specific hardware including the robot, end effector, and ancillary devices.

As an example, the application control module 350 may provide feedback indicating how well the abrasive is cutting the surface of the substrate 120 based on resistance and pressure applied, may measure the milkiness of water used in the process as milky water is indicative of the amount of swarf, which is, in turn, indicative of how well the cutting is occurring. Similarly, the sanding disk may be inspected after sanding with a camera or by eye to determine if there is an excessive amount of material on the disk. The application control module 350 would then adjust the process 300 accordingly.

With respect to the input form, the input forms can range from (simple) discrete and/or scalar inputs to the most general (sophisticated) case of arbitrary time-varying functions. In the latter case, the application control module 350 must have real-time interfacing to all relevant hardware and sensors.

Computer Embodiment

Figure 22:
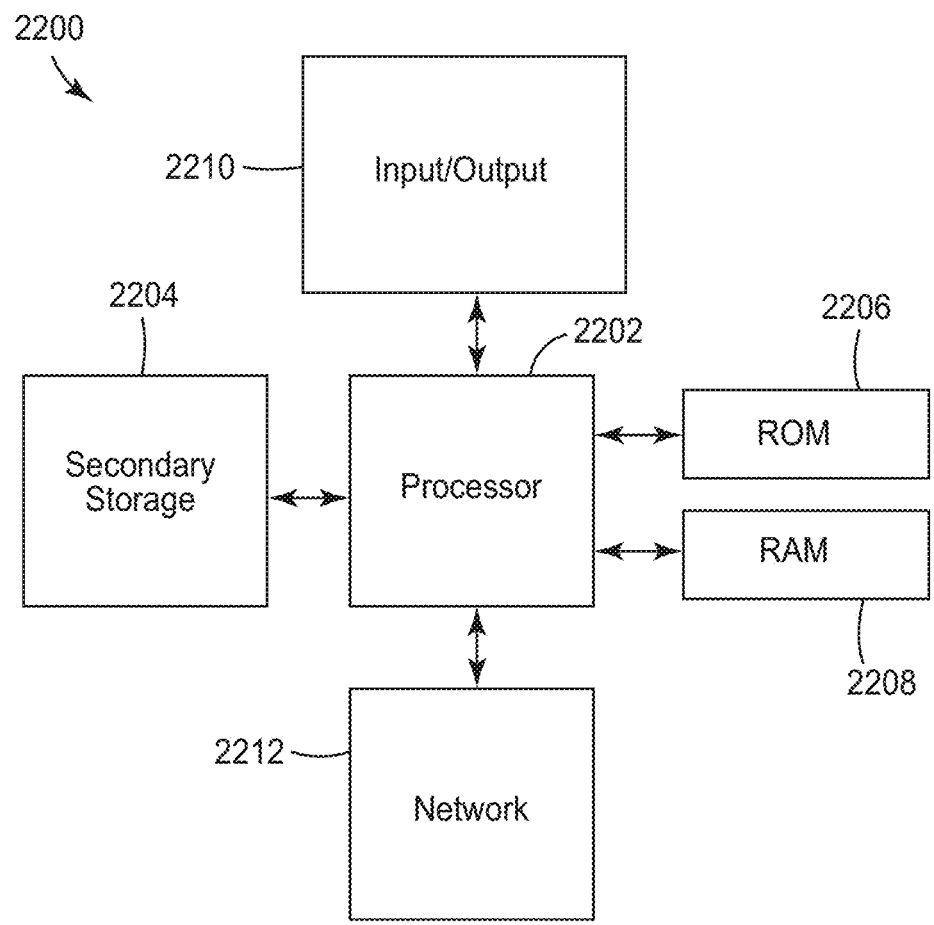
FIG. 22 illustrates a general-purpose computer that may be programmed into a special purpose computer suitable for implementing one or more embodiments of the system described in sample embodiments.

FIG. 22 illustrates a typical, general-purpose computer that may be programmed into a special purpose computer suitable for implementing one or more embodiments of the system disclosed herein. The robot controller module 102, ancillary control module 1004, machine learning unit 1008, and cloud computing system 1006 described above may be implemented on special-purpose processing devices or on any general-purpose processing component, such as a computer with sufficient processing power, memory resources, and communications throughput capability to handle the necessary workload placed upon it. Such a general-purpose processing component 2200 includes a processor 2202 (which may be referred to as a central processor unit or CPU) that is in communication with memory devices including secondary storage 2204, read only memory (ROM) 2206, random access memory (RAM) 2208, input/output (I/O) devices 2210, and network connectivity devices 2212. The processor 2202 may be implemented as one or more CPU chips or may be part of one or more application specific integrated circuits (ASICs).

The secondary storage 2204 is typically comprised of one or more disk drives or tape drives and is used for non-volatile storage of data and as an over-flow data storage device if RAM 2208 is not large enough to hold all working data. Secondary storage 2204 may be used to store programs that are loaded into RAM 2208 when such programs are selected for execution. The ROM 2206 is used to store instructions and perhaps data that are read during program execution. ROM 2206 is a non-volatile memory device that typically has a small memory capacity relative to the larger memory capacity of secondary storage 2204. The RAM 2208 is used to store volatile data and perhaps to store instructions. Access to both ROM 2206 and RAM 2208 is typically faster than to secondary storage 2204.

The devices described herein can be configured to include computer-readable non-transitory media storing computer readable instructions and one or more processors coupled to the memory, and when executing the computer readable instructions configure the processing component 2200 to perform method steps and operations described above with reference to FIG. 1 to FIG. 21. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure can be installed in and sold with one or more servers and/or one or more routers and/or one or more devices within consumer and/or producer domains consistent with the disclosure. Alternatively, the software can be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof, are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. To the extent such signals are transitory, the term "machine-readable medium" as used herein excludes signals per se.

The above-presented description and figures are intended by way of example only and are not intended to limit the illustrative embodiments in any way except as set forth in the appended claims. It is noted that various technical aspects of the various elements of the various exemplary embodiments that have been described above can be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

What is claimed is:

1. A method of automated abrasive repair, comprising:
   receiving, by one or more processors, pre-inspection data comprising:
   (i) coordinates of a defect in a substrate such that a robot manipulator can bring an end effector mounted on the robot manipulator into close proximity with the defect, wherein the end effector comprises:
      i. end effector sensors including at least one camera to collect data comprising at least one of fringe pattern projection, deflectometry, and intensity measurements of diffuse reflected or normal white light; and
      ii. automated abrasive paint repair devices comprising at least one of a sanding tool, a buffing/polishing tool, and a compliant force flange;
   (ii) at least one of a defect type from a classifier, approximate volumetric information describing the defect, and substrate material information;
   moving the robot manipulator to bring the end effector into close proximity with the defect based on the coordinates of the defect;
   collecting local in-situ inspection data comprising at least one of fringe pattern projection, deflectometry, and intensity measurements of diffuse reflected or normal white light by triggering the end effector sensors;
   receiving, by the one or more processors, parameters describing characteristics of the defect determined from the pre-inspection data and the local in-situ inspection data;
   selecting, by the one or more processors, at least one of a sanding process, a buffing process, a polishing process, or combinations thereof to repair the defect based on a parameter selection algorithm that selects parameters from stored empirically derived rules and stored parameters according to empirically engineered parametric functions of the received parameters;
   instructing, by the one or more processors, the automated abrasive repair devices to execute the selected process;
   repairing the defect by executing, with the automated repair devices, the selected process; and
   providing, by the one or more processors, the local in-situ inspection data to a machine learning unit;
   using, by the machine learning unit, the local in situ inspection data to create learning updates by updating the stored empirically derived rules, wherein the updated stored empirically derived rules are used to improve future automated abrasive repair actions; and
   after repairing the defect:
   collecting post-inspection data comprising at least one of fringe pattern projection, deflectometry, and intensity measurements of diffuse reflected or normal white light by triggering the end effector sensors;
   receiving, by the one or more processors, the post-inspection data and evaluating the repair of the defect; and
   providing, by the one or more processors, the post-inspection data to the machine learning unit along with the pre-inspection data and the local in-situ inspection data; and
   using, by the machine learning unit, the post-inspection data, the pre-inspection data, and the local in situ inspection data to create learning updates by updating the stored empirically derived rules, wherein the updated stored empirically derived rules are used to improve future automated abrasive repair actions.

2. The method of claim 1 comprising the further steps of, after evaluating the repair, determining whether the repair is satisfactory and:
   in response to determining that the repair is satisfactory, proceeding to the step of providing, by the one or more processors, the post-inspection data to the machine learning unit along with the pre-inspection data and the local in-situ inspection data.

3. The method of claim 1 comprising the further steps of, after evaluating the repair, determining whether the repair is satisfactory and:
   in response to determining that the repair is satisfactory, proceeding to the step of providing, by the one or more processors, the post-inspection data to the machine learning unit along with the pre-inspection data and the local in-situ inspection data.

4. The method of claim 1 comprising the further steps of, after evaluating the repair, determining whether the repair is satisfactory and:
   in response to determining that the repair is not satisfactory, repeating the steps of moving the robot manipulator to bring the end effector into close proximity with the defect through repairing the defect until the repair is deemed satisfactory.

5. The method of claim 1 comprising the further steps of, after evaluating the repair, determining whether the repair is satisfactory and:
   in response to determining that the repair is not satisfactory, repeating the steps of moving the robot manipulator to bring the end effector into close proximity with the defect through repairing the defect until the repair is deemed satisfactory.

* * * * *